(12) United States Patent
Ohishi

(10) Patent No.: US 6,983,369 B2
(45) Date of Patent: Jan. 3, 2006

(54) AUTHENTICATION SYSTEM, AND CONTENTS-INFORMATION SENDER AND RECEIVER

(75) Inventor: Takeo Ohishi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 1000 days.

(21) Appl. No.: 09/836,325

(22) Filed: Apr. 18, 2001

(65) Prior Publication Data

US 2001/0039613 A1   Nov. 8, 2001

(30) Foreign Application Priority Data

May 2, 2000   (JP)   .............................. 2000-133957
Apr. 2, 2001   (JP)   .............................. 2001-103743

(51) Int. Cl.
H01L 9/00   (2006.01)

(52) U.S. Cl. ...................... 713/175; 713/156; 713/168; 713/176; 380/262; 380/277; 705/51; 705/54; 705/57

(58) Field of Classification Search ................ 713/156, 713/168, 171, 176, 200; 380/262, 28, 277; 705/51, 54, 57
See application file for complete search history.

(56) References Cited

U.S. PATENT DOCUMENTS 5,613,004 A * 3/1997 Cooperman et al. .......... 380/28
5,949,877 A * 9/1999 Traw et al. .................. 713/171
6,542,610 B2 * 4/2003 Traw et al. .................. 713/168
6,671,803 B1 * 12/2003 Pasieka ....................... 713/156

FOREIGN PATENT DOCUMENTS

EP   0874299   10/1998
WO   00/21241   4/2000

OTHER PUBLICATIONS

DTCP: "5C Digital Transmission Content Protection White Paper", Rev. 1.0, Jul. 14, 1998, pp 1-13, XP002213172.

* cited by examiner

Primary Examiner—Gilberto Barron, Jr.
Assistant Examiner—A. Nobahar
(74) Attorney, Agent, or Firm—Louis Woo

(57) ABSTRACT

First information is sent from a contents-information receiver apparatus to a contents-information sender apparatus. The first information includes a combination of certificate information and second information for the contents-information receiver apparatus. The first information further includes a signal of a signature for the combination of the certificate information and the second information. In the contents-information sender apparatus, a determination is made as to whether the combination of the certificate information and the second information in the first information is correct or wrong in response to the signal of the signature in the first information. In the contents-information sender apparatus, the second information is extracted from the first information before being stored. The second information for the contents-information receiver apparatus is sent from the contents-information receiver apparatus to the contents-information sender apparatus. In the contents-information sender apparatus, the sent second information is collated with the stored second information.

32 Claims, 13 Drawing Sheets

AUTHENTICATION SYSTEM, AND CONTENTS-INFORMATION SENDER AND RECEIVER

BACKGROUND OF THE INVENTION

1. Field of the Invention

This invention relates to a method of authentication, a contents-information sender apparatus, a contents-information receiver apparatus, and an authentication system.

2. Description of the Related Art

According to a typical method of protecting the copyright on contents during the transmission thereof, a sender encrypts information representative of the contents and transmits the encryption-resultant contents information to a receiver. To enhance the ability to protect the copyright, authentication is implemented. Specifically, the receiver transmits its own ID (identification) signal to the sender. The sender decides whether the receiver is legitimate or illegal by referring to the ID signal transmitted from the receiver. When the receiver is decided to be legitimate, the sender executes the transmission of the encryption-resultant contents information to the receiver. On the other hand, when the receiver is decided to be illegal, the sender does not transmit the encryption-resultant contents information to the receiver.

In the case where an illegal receiver transmits a correct ID signal to the sender, the encryption-resultant contents information is transmitted from the sender to the illegal receiver. If the encryption-resultant contents information received by the illegal receiver is successfully decrypted, the copyright on the contents will be infringed.

SUMMARY OF THE INVENTION

It is a first object of this invention to provide an improved method of authentication.

It is a second object of this invention to provide an improved contents-information sender apparatus.

It is a third object of this invention to provide an improved contents-information receiver apparatus.

It is a fourth object of this invention to provide an improved authentication system.

A first aspect of this invention provides a method of authentication. The method comprises the steps of a) sending first information from a contents-information receiver apparatus to a contents-information sender apparatus, the first information including a combination of certificate information and second information for the contents-information receiver apparatus, the first information further including a signal of a signature for the combination of the certificate information and the second information; b) in the contents-information sender apparatus, determining whether the combination of the certificate information and the second information in the first information is correct or wrong in response to the signal of the signature in the first information; c) in the contents-information sender apparatus, extracting the second information from the first information and storing the extracted second information; d) sending the second information for the contents-information receiver apparatus from the contents-information receiver apparatus to the contents-information sender apparatus; and e) in the contents-information sender apparatus, collating the second information sent by the step d) with the second information stored by the step c).

A second aspect of this invention is based on the first aspect thereof, and provides a method wherein the certificate information contains information of a reliability of the contents-information receiver apparatus.

A third aspect of this invention provides a contents-information sender apparatus comprising first means for receiving first information from a contents-information receiver apparatus, the first information including a combination of certificate information and second information for the contents-information receiver apparatus, the first information further including a signal of a signature for the combination of the certificate information and the second information; second means for determining whether the combination of the certificate information and the second information in the first information received by the first means is correct or wrong in response to the signal of the signature in the first information; third means for extracting the second information from the first information received by the first means and storing the extracted second information; fourth means for receiving the second information for the contents-information receiver apparatus from the contents-information receiver apparatus; and fifth means for collating the second information received by the fourth means with the second information stored by the third means.

A fourth aspect of this invention is based on the third aspect thereof, and provides a contents-information sender apparatus wherein the certificate information contains information of a reliability of the contents-information receiver apparatus.

A fifth aspect of this invention provides a contents-information receiver apparatus comprising first means for sending first information to a contents-information sender apparatus, the first information including a combination of certificate information and second information for the contents-information receiver apparatus, the first information further including a signal of a signature for the combination of the certificate information and the second information; and second means for sending the second information for the contents-information receiver apparatus to the contents-information sender apparatus.

A sixth aspect of this invention is based on the fifth aspect thereof, and provides a contents-information receiver apparatus wherein the certificate information contains information of a reliability of the contents-information receiver apparatus.

A seventh aspect of this invention provides an authentication system including a contents-information sender apparatus and a contents-information receiver apparatus. The authentication system comprises first means for sending first information from the contents-information receiver apparatus to the contents-information sender apparatus, the first information including a combination of certificate information and second information for the contents-information receiver apparatus, the first information further including a signal of a signature for the combination of the certificate information and the second information; second means provided in the contents-information sender apparatus for determining whether the combination of the certificate information and the second information in the first information sent by the first means is correct or wrong in response to the signal of the signature in the first information; third means provided in the contents-information sender apparatus for extracting the second information from the first information sent by the first means and storing the extracted second information; fourth means for sending the second information for the contents-information receiver apparatus from the contents-information receiver apparatus to the contents-information sender apparatus; and fifth means provided in the the contents-information sender apparatus for collating the second information sent by the fourth means with the second information stored by the third means.

An eighth aspect of this invention is based on the seventh aspect thereof, and provides an authentication system wherein the certificate information contains information of a reliability of the contents-information receiver apparatus.

A ninth aspect of this invention is based on the first aspect thereof, and provides a method wherein the certificate information contains a signal of a public key being a mate to a secret key for generating the signal of the signature from the combination of the certificate information and the second information.

A tenth aspect of this invention is based on the first aspect thereof, and provides a method wherein the certificate information contains information related to a copyright on contents.

An eleventh aspect of this invention is based on the first aspect thereof, and provides a method wherein the certificate information contains public information given only to licensees.

A twelfth aspect of this invention is based on the first aspect thereof, and provides a method wherein the certificate information contains a signal of a public key peculiar to the contents-information receiver apparatus.

A thirteenth aspect of this invention is based on the first aspect thereof, and provides a method wherein the certificate information is given to the contents-information receiver apparatus by a management organ.

A fourteenth aspect of this invention is based on the first aspect thereof, and provides a method further comprising the step of, after the step e), exchanging a signal of a first key and a signal of a second key between the contents-information sender apparatus and the contents-information receiver apparatus.

A fifteenth aspect of this invention is based on the third aspect thereof, and provides a contents-information sender apparatus wherein the certificate information contains a signal of a public key being a mate to a secret key for generating the signal of the signature from the combination of the certificate information and the second information.

A sixteenth aspect of this invention is based on the third aspect thereof, and provides a contents-information sender apparatus wherein the certificate information contains information related to a copyright on contents.

A seventeenth aspect of this invention is based on the third aspect thereof, and provides a contents-information sender apparatus wherein the certificate information contains public information given only to licensees.

An eighteenth aspect of this invention is based on the third aspect thereof, and provides a contents-information sender apparatus wherein the certificate information contains a signal of a public key peculiar to the contents-information receiver apparatus.

A nineteenth aspect of this invention is based on the third aspect thereof, and provides a contents-information sender apparatus wherein the certificate information is given to the contents-information receiver apparatus by a management organ.

A twentieth aspect of this invention is based on the third aspect thereof, and provides a contents-information sender apparatus further comprising sixth means for, after the collating by the fifth means, exchanging a signal of a first key and a signal of a second key with the contents-information receiver apparatus.

A twenty-first aspect of this invention is based on the fifth aspect thereof, and provides a contents-information receiver apparatus wherein the certificate information contains a signal of a public key being a mate to a secret key for generating the signal of the signature from the combination of the certificate information and the second information.

A twenty-second aspect of this invention is based on the fifth aspect thereof, and provides a contents-information receiver apparatus wherein the certificate information contains information related to a copyright on contents.

A twenty-third aspect of this invention is based on the fifth aspect thereof, and provides a contents-information receiver apparatus wherein the certificate information contains public information given only to licensees.

A twenty-fourth aspect of this invention is based on the fifth aspect thereof, and provides a contents-information receiver apparatus wherein the certificate information contains a signal of a public key peculiar to the contents-information receiver apparatus.

A twenty-fifth aspect of this invention is based on the fifth aspect thereof, and provides a contents-information receiver apparatus wherein the certificate information is given to the contents-information receiver apparatus by a management organ.

A twenty-sixth aspect of this invention is based on the fifth aspect thereof, and provides a contents-information receiver apparatus further comprising third means for exchanging a signal of a first key and a signal of a second key with the contents-information sender apparatus after second-information collation is done by the contents-information sender apparatus.

A twenty-seventh aspect of this invention is based on the seventh aspect thereof, and provides an authentication system wherein the certificate information contains a signal of a public key being a mate to a secret key for generating the signal of the signature from the combination of the certificate information and the second information.

A twenty-eighth aspect of this invention is based on the seventh aspect thereof, and provides an authentication system wherein the certificate information contains information related to a copyright on contents.

A twenty-ninth aspect of this invention is based on the seventh aspect thereof, and provides an authentication system wherein the certificate information contains public information given only to licensees.

A thirtieth aspect of this invention is based on the seventh aspect thereof, and provides an authentication system wherein the certificate information contains a signal of a public key peculiar to the contents-information receiver apparatus.

A thirty-first aspect of this invention is based on the seventh aspect thereof, and provides an authentication system wherein the certificate information is given to the contents-information receiver apparatus by a management organ.

A thirty-second aspect of this invention is based on the seventh aspect thereof, and provides an authentication system further comprising sixth means for, after the collating by the fifth means, exchanging a signal of a first key and a signal of a second key between the contents-information sender apparatus and the contents-information receiver apparatus.

DETAILED DESCRIPTION OF THE INVENTION

First Embodiment

Figure 1:
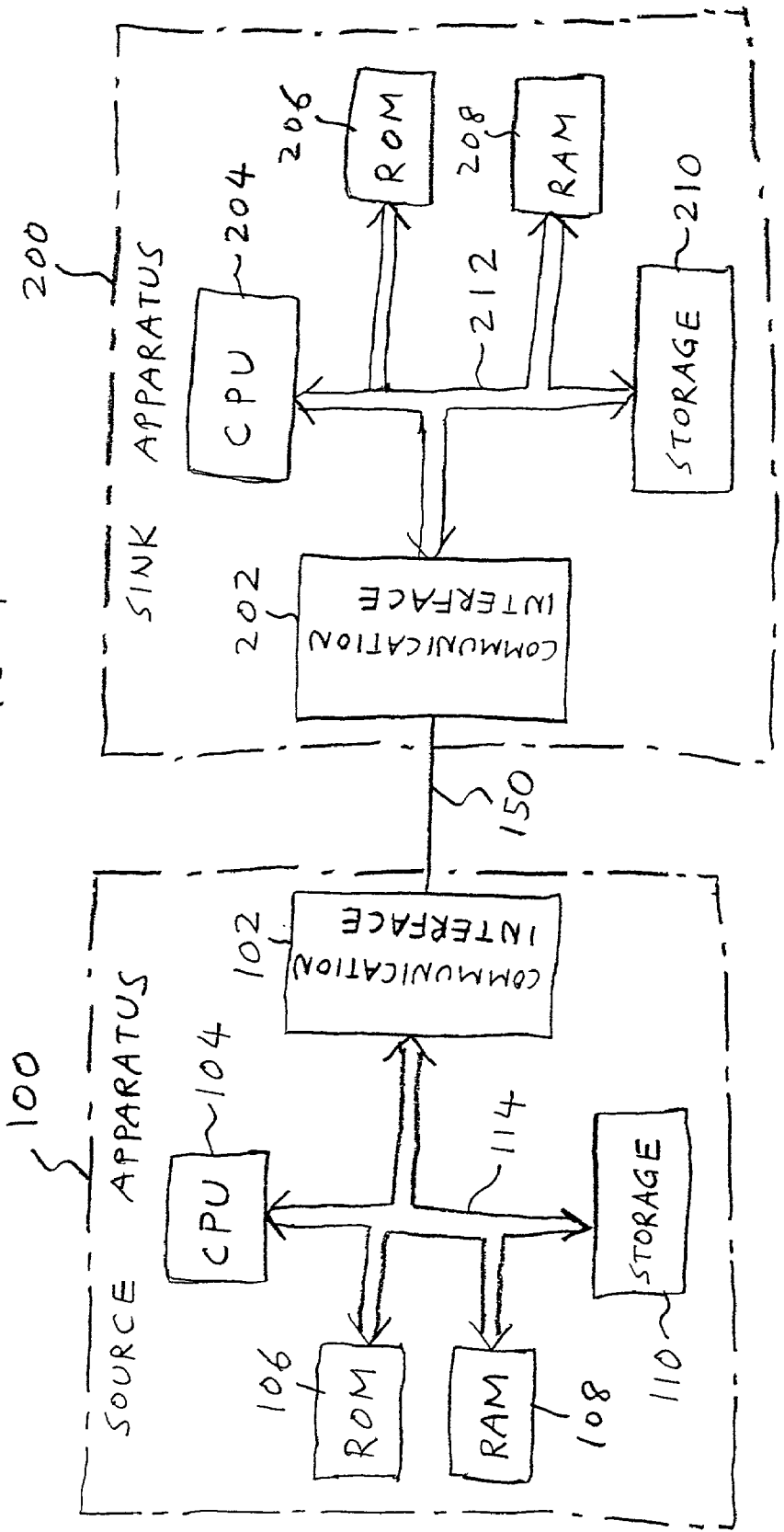
FIG. 1 is a block diagram of a contents-information transmission system according to a first embodiment of this invention.

FIG. 1 shows a contents-information transmission system according to a first embodiment of this invention. The system of FIG. 1 includes a source apparatus 100 and a sink apparatus 200 which are connected to each other via a transmission medium 150. Various signals and various types of information can be transmitted between the source apparatus 100 and the sink apparatus 200 via the transmission medium 150. The source apparatus 100 and the sink apparatus 200 are also referred to as the contents-information sender apparatus and the contents-information receiver apparatus, respectively. The transmission medium 150 includes, for example, an IEEE1394 transmission line, a local area network, a communication network, the Internet, or a wireless transmission line.

In the system of FIG. 1, a sequence of first, second, and third processes for authentication is executed before contents information is transmitted from the source apparatus 100 to the sink apparatus 200 via the transmission medium 150. The third process is also referred to as the key exchange process.

The source apparatus 100 includes a communication interface 102, a processing unit (a CPU) 104, a ROM 106, a RAM 108, and a storage device 110 which are connected to each other via a bus 114 to form a signal processing system or a computer system. The source apparatus 100 (the CPU 104) operates in accordance with a program stored in the ROM 106. For example, contents information (contents data) is stored in an interface-added storage unit (not shown) connected to the bus 114. In this case, the contents information is transferred from the interface-added storage unit to the communication interface 102 before being sent to the sink apparatus 200. Contents information may be fed to the communication interface 102 from an external via an interface and the bus 114. The communication interface 102 is connected to the transmission medium 150. Preferably, the communication interface 102 is of a digital type.

The sink apparatus 200 includes a communication interface 202, a processing unit (a CPU) 204, a ROM 206, a RAM 208, and a storage device 210 which are connected to each other via a bus 212 to form a signal processing system or a computer system. The sink apparatus 200 (the CPU 204) operates in accordance with a program stored in the ROM 206. The communication interface 202 is connected to the transmission medium 150. Preferably, the communication interface 202 is of a digital type.

Various signals, various types of information, and contents information can be transmitted between the communication interface 102 in the source apparatus 100 and the communication interface 202 in the sink apparatus 200 via the transmission medium 150.

Figure 2:
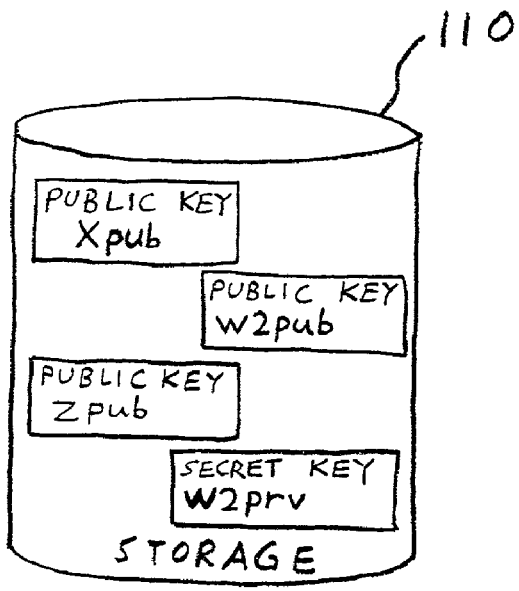
FIG. 2 is a diagram of signals stored in a storage device within a source apparatus in FIG. 1.

As shown in FIG. 2, the storage device 110 in the source apparatus 100 stores a signal representing a public key Xpub, a signal representing a public key Zpub, a signal representing a public key W2pub, and a signal representing a secret key (a private key) W2prv.

Figure 3:
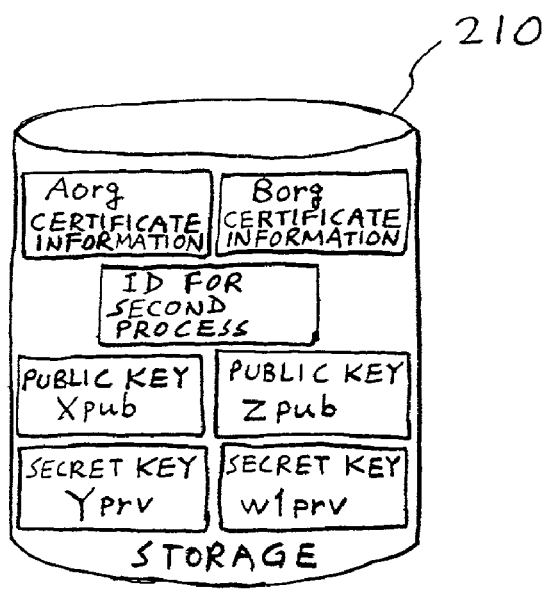
FIG. 3 is a diagram of signals stored in a storage device within a sink apparatus in FIG. 1.

As shown in FIG. 3, the storage device 210 in the sink apparatus 200 stores "Aorg" certificate information, a signal representing a secret key (a private key) Yprv, ID (identification) information for the second process, "Borg" certificate information, a signal representing a secret key (a private key) W1prv, a signal representing the public key Xpub, and a signal representing the public key Zpub. The ID information for the second process includes ID information for the sink apparatus 200.

Figure 4:
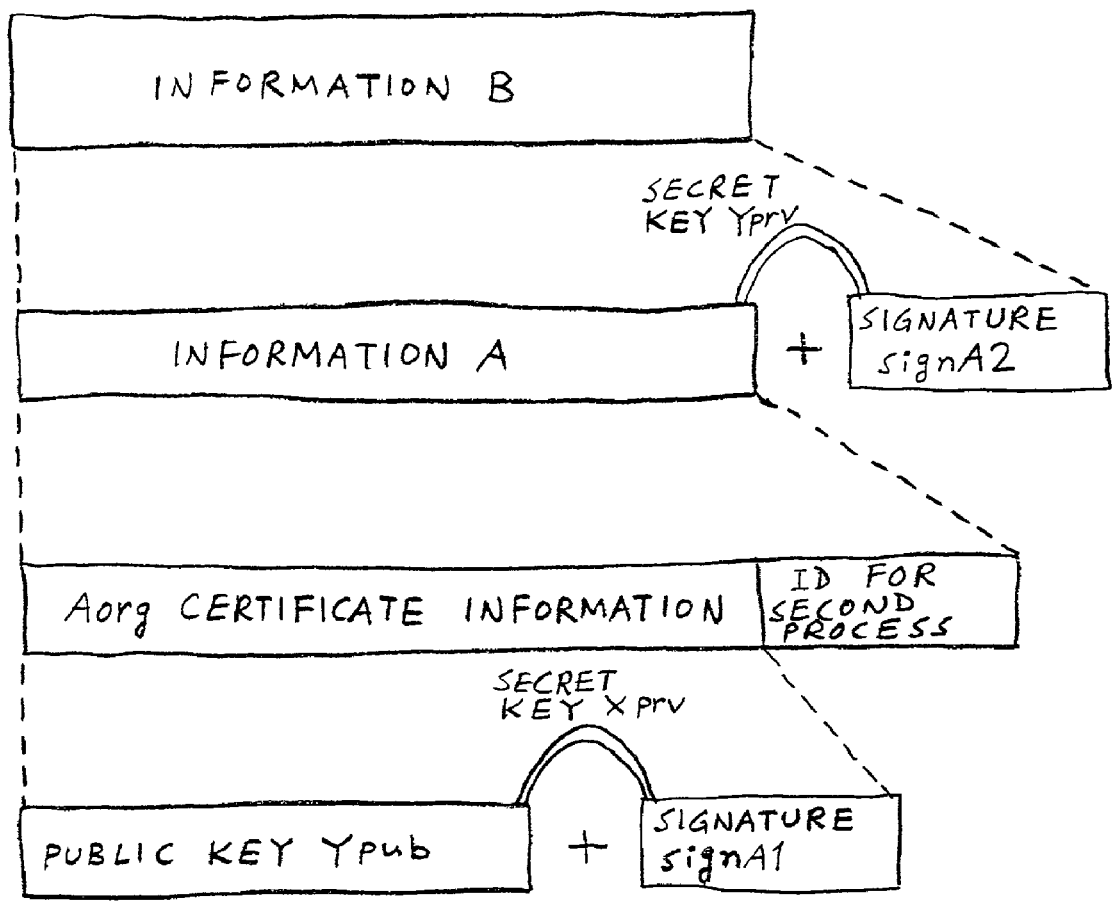
FIG. 4 is a diagram of the structure of information "B".
Figure 5:
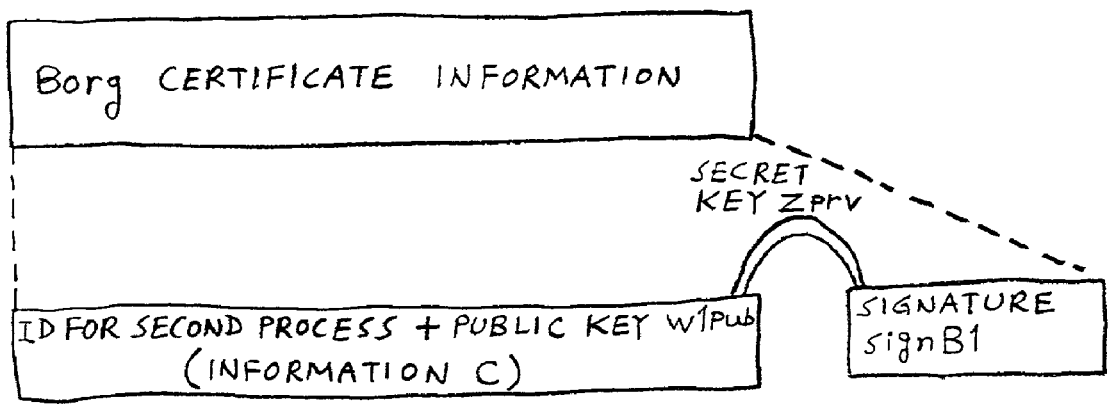
FIG. 5 is a diagram of the structure of "Borg" certificate information.

As shown in FIG. 4, the "Aorg" certificate information contains a signal representing a public key Ypub. As shown in FIG. 5, the "Borg" certificate information contains a signal representing a public key W1pub.

The first process uses the signal of the public key Xpub which is stored in the storage device 110 of the source apparatus 100. The first process also uses the ID information for the second process, the signal of the secret key Yprv, and the "Aorg" certificate information which are stored in the storage device 210 of the sink apparatus 200.

There is a management organ Aorg for the first process which issues licenses to suitable apparatuses (suitable source apparatuses and suitable sink apparatuses). The public key Xpub is owned in common by all of the licensed apparatuses. The public key Xpub and a secret key (a private key) Xprv form a pair.

There is a management organ Borg which gives apparatuses (source apparatuses and sink apparatuses) identifiers respectively. The identifiers are peculiar to the apparatuses respectively. The apparatuses can be identified by referring to the identifiers. The ID information for the second process means an identifier which is given to the sink apparatus 200 by the management organ Borg. The sink apparatus 200 can be identified by referring to the ID information for the second process.

The signal of the secret key Yprv is inhibited from being outputted from the sink apparatus 200 to an external. As will be mentioned later, the signal of the secret key Yprv is used in generating a signal representing a signature signA2. The secret key Yprv and the public key Ypub form a pair.

Apparatuses (source apparatuses and sink apparatuses) have secret keys (private keys) Yprv respectively. The secret keys Yprv are peculiar to the apparatuses respectively. The management organ Aorg gives public keys Ypub to the apparatuses respectively. The public keys Ypub are peculiar to the apparatuses respectively. Each of the public keys Ypub is used in decrypting an information piece or a signal which has been encrypted on the basis of the related secret key Yprv.

The management organ Aorg previously gives the "Aorg" certificate information to the sink apparatus 200. As shown in FIG. 4, the "Aorg" certificate information contains the signal of the public key Ypub. The signal of the public key Ypub or original information containing the signal of the public key Ypub is subjected to specified compression (specified operation) responsive to a one-way function such as a hash function, being converted into compression-resultant information. The compression-resultant information is encrypted into a signal representative of a signature signA1 in response to the signal of the secret key Xprv. The signal of the public key Ypub or the original information containing the signal of the public key Ypub may be directly encrypted into a signal of a signature signA1 in response to the signal of the secret key Xprv. The signal of the signature signA1 is added to or combined with the signal of the public key Ypub or the original information containing the signal of the public key Ypub. The combination of the original information (or the signal of the public key Ypub) and the signal of the signature signA1 forms the "Aorg" certificate information. Thus, the "Aorg" certificate information additionally has the signal of the signature signA1. Public information given only to licensees by the management organ Aorg can be used as the "Aorg" certificate information. As previously mentioned, the signal of the secret key Xprv is used in generating the signal of the signature signA1. The secret key Xprv is managed only by the management organ Aorg. Accordingly, third parties except the management organ Aorg can not make the "Aorg" certificate information which contains the signal of the signature signA1.

The signal of the secret key Xprv may be subjected to prescribed operation, being converted into a signal of a second secret key. In this case, the second secret key is used instead of the secret key Xprv for the encryption.

A combination of the "Aorg" certificate information and the ID information for the second process is referred to as information "A" (see FIG. 4). According to a first example of the combination, the "Aorg" certificate information and the ID information for the second process are sequentially arranged and connected. According to a second example of the combination, the "Aorg" certificate information and the ID information for the second process are divided into portions, and portions of the "Aorg" certificate information and portions of the ID information are alternately arranged. A third example of the combination results from subjecting the "Aorg" certificate information and the ID information to predetermined operation. It is preferable that the information "A" is previously given to the sink apparatus 200. The signal of the secret key Yprv is previously provided in the sink apparatus 200. The signal of the secret key Yprv is used in generating the signal of the signature signA2. With reference to FIG. 4, the information "A" is subjected to specified compression (specified operation) responsive to a one-way function such as a hash function, being converted into compression-resultant information. The compression-resultant information is encrypted into a signal representative of a signature signA2 in response to the signal of the secret key Yprv. The information "A" may be directly encrypted into a signal of a signature signA2 in response to the signal of the secret key Yprv. The signal of the signature signA2 is added to or combined with the information "A". The combination of the information "A" and the signal of the signature signA2 forms information "B". Thus, the information "B" additionally has the signal of the signature signA2.

The signal of the secret key Yprv may be subjected to prescribed operation, being converted into a signal of a second secret key. In this case, the second secret key is used instead of the secret key Yprv for the encryption.

During the first process, the information "B" is transmitted from the sink apparatus 200 to the source apparatus 100. The source apparatus 100 extracts the signal of the public key Ypub and the signal of the signature signA1 from the information "B". The source apparatus 100 can decide whether or not the extracted signal of the public key Ypub has been altered by referring to the extracted signal of the signature signal. The source apparatus 100 extracts the information "A" and the signal of the signature signA2 from the information "B". The source apparatus 100 can decide whether or not the extracted information "A" has been altered by referring to the extracted signal of the signature signA2.

The second process and the key exchange process use the signal of the secret key W2prv, the signal of the public key Zpub, and the signal of the public key W2pub which are stored in the storage device 110 of the source apparatus 100. The second process and the key exchange process also use the signal of the secret key W1prv, the ID information for the second process, the "Borg" certificate information, and the signal of the public key Zpub which are stored in the storage device 210 of the sink apparatus 200. As shown in FIG. 5, the "Borg" certificate information contains the signal of the public key W1pub. The "Borg" certificate information also contains a signal representing a signature signB1.

The management organ Borg issues licenses to suitable apparatuses (suitable source apparatuses and suitable sink apparatuses). The public key Zpub is owned in common by all of the licensed apparatuses. The public key Zpub and a secret key (a private key) Zprv form a pair. As will be mentioned later, the signal of the secret key Zprv is used in generating the signal of the signature signB1. The secret key Zprv is managed only by the management organ Borg. Accordingly, third parties except the management organ Borg can not make the "Borg" certificate information which contains the signal of the signature signB1.

With reference to FIG. 5, a combination of the ID information for the second process and the signal of the public key W1pub is referred to as information "C". The information "C" is subjected to specified compression (specified operation) responsive to a one-way function such as a hash function, being converted into compression-resultant information. The compression-resultant information is encrypted into the signal representative of the signature signB1 in response to the signal of the secret key Zprv. The information "C" may be directly encrypted into a signal of a signature signB1 in response to the signal of the secret key Zprv. The signal of the signature signB1 is added to or combined with the information "C". The combination of the information "C" and the signal of the signature signB1 forms the "Borg" certificate information. Thus, the "Borg" certificate information additionally has the signal of the signature signB1.

The signal of the secret key Zprv may be subjected to prescribed operation, being converted into a signal of a second secret key. In this case, the second secret key is used instead of the secret key Zprv for the encryption.

During the second process, the "Borg" certificate information is transmitted from the sink apparatus 200 to the source apparatus 100. The source apparatus 100 extracts the information "C" and the signal of the signature signB1 from the "Borg" certificate information. The source apparatus 100 can decide whether or not the extracted information "C" has been altered by referring to the extracted signal of the signature signB1.

The public key W1pub, the public key W2pub, the secret key W1prv, and the secret key W2prv are used in the key exchange process. The signal of the public key W1pub and the signal of the public key W2pub are exchanged between the source apparatus 100 and the sync apparatus 200. The management organ Borg issues licenses to suitable sink apparatuses. In general, different public keys W1pub are assigned to and owned by the licensed sink apparatuses respectively. The management organ Borg issues licenses to suitable source apparatuses. In general, different public keys W2pub are assigned to and owned by the licensed source apparatuses respectively. The management organ Borg gives private keys W1prv to the licensed sink apparatuses respectively. The private keys W1prv are peculiar to the licensed sink apparatuses respectively. The public keys W1pub and the private keys W1prv make pairs assigned to the licensed sink apparatuses respectively. The management organ Borg gives private keys W2prv to the licensed source apparatuses respectively. The private keys W2prv are peculiar to the licensed source apparatuses respectively. The public keys W2pub and the private keys W2prv make pairs assigned to the licensed source apparatuses respectively.

Figure 6:
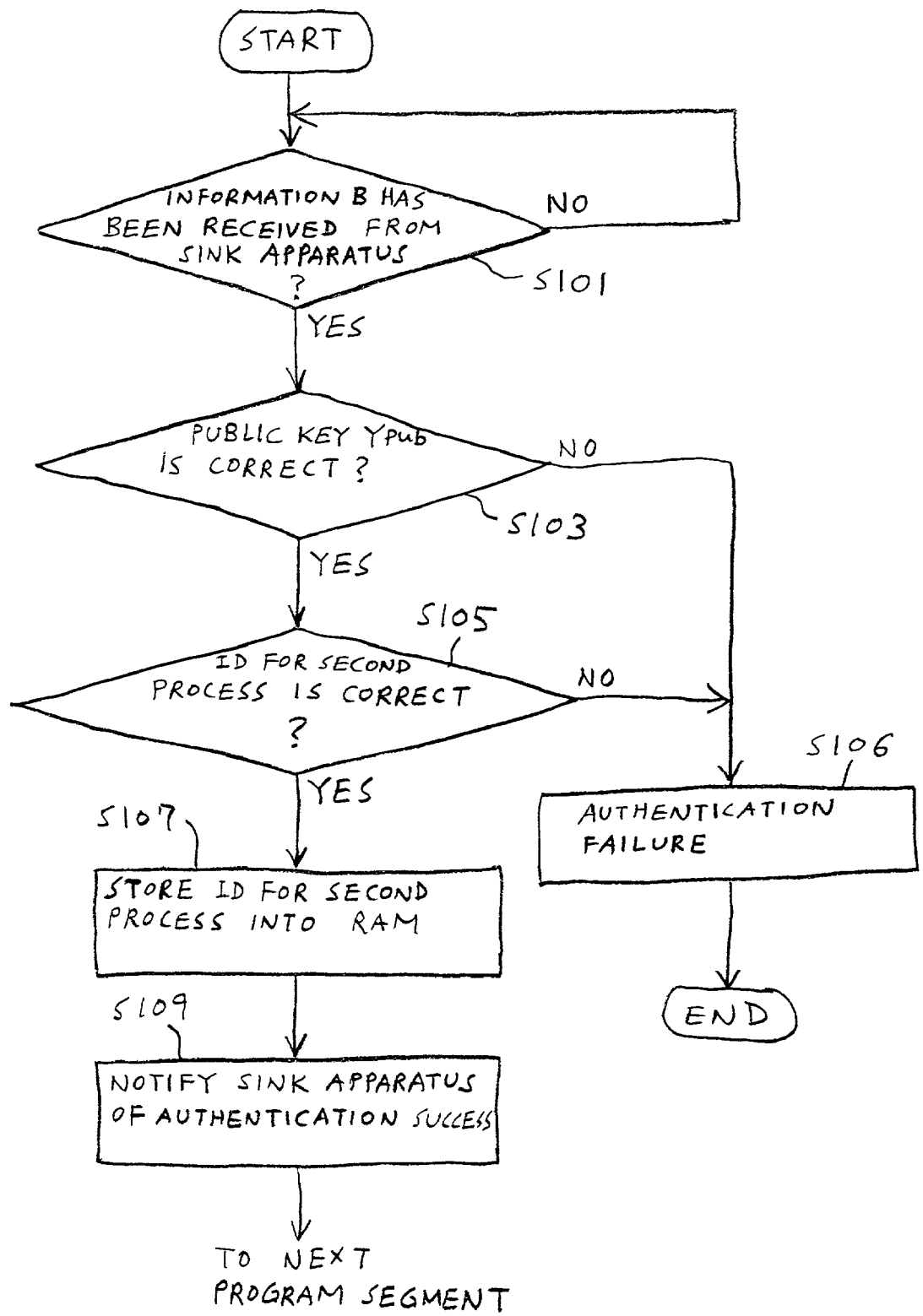
FIG. 6 is a flowchart of a first segment of a program for a CPU within the source apparatus in FIG. 1.

As previously mentioned, the source apparatus 100 (the CPU 104) operates in accordance with a program stored in the ROM 106. FIG. 6 is a flowchart of a segment of the program which is executed during the first process. As shown in FIG. 6, a first step S101 of the program segment decides whether or not the information "B" has been received from the sink apparatus 200. When the information "B" has been received, the program advances from the step S101 to a step S103. Otherwise, the step S101 is repeated. Accordingly, the step S101 waits for the information "B".

The information "B" is provided in the storage device 210 of the sink apparatus 200. As shown in FIG. 4, the information "B" contains the combination of the information "A" and the signal of the signature signA2. The signal of the signature signA2 is generated from the information "A" through the specified compression responsive to the one-way function and the specified operation (the encryption) responsive to the signal of the secret key Yprv which is previously given to the sink apparatus 200. The information "A" contains the combination of the "Aorg" certificate information and the ID information for the second process. The "Aorg" certificate information contains the combination of the signal of the public key Ypub and the signal of the signature signA1.

With reference back to FIG. 6, the step S103 decides whether or not the signal of the public key Ypub in the received information "B" has been altered. Specifically, the step S103 extracts the signal of the public key Ypub (or the original information containing the public key) and the signal of the signature signA1 from the received information "B". As previously mentioned, the signal of the signature signA1 is generated by 1) subjecting the signal of the public key Ypub or the original information containing the signal of the public key Ypub to specified compression (specified operation) responsive to a one-way function such as a hash function, and 2) encrypting the compression-resultant information into the signal of the signature signA1 in response to the signal of the secret key Xprv. The step S103 subjects the extracted signal of the public key Ypub (or the extracted original information containing the signal of the public key Ypub) to the specified compression responsive to the one-way function. The step S103 decrypts the extracted signal of the signature signA1 in response to the signal of the public key Xpub (the mate to the secret key Xprv). The step S103 compares the compression-resultant signal and the decryption-resultant signal. When the compression-resultant signal and the decryption-resultant signal are the same, the step S103 determines that the signal of the public key Ypub in the received information "B" has not been altered. In this case, the program advances from the step S103 to a step S105. When the compression-resultant signal and the decryption-resultant signal are different from each other, the step S103 determines that the signal of the public key Ypub in the received information "B" has been altered. In this case, the program advances from the step S103 to a step S106.

The step S105 decides whether or not the information "A" and the ID information for the second process in the received information "B" have been altered. Specifically, the step S105 extracts the information "A" and the signal of the signature signA2 from the received information "B". As previously mentioned, the signal of the signature signA2 is generated by 1) subjecting the information "A" to specified compression (specified operation) responsive to a one-way function such as a hash function, and 2) encrypting the compression-resultant information into the signal of the signature signA2 in response to the signal of the secret key Yprv. The step S105 subjects the extracted information "A" to the specified compression responsive to the one-way function. The step S105 decrypts the extracted signal of the signature signA2 in response to the signal of the public key Ypub (the mate to the secret key Yprv). The step S105 compares the compression-resultant signal (the compression-resultant information) and the decryption-resultant signal. When the compression-resultant signal and the decryption-resultant signal are the same, the step S105 determines that the information "A" and the ID information for the second process in the received information "B" have not been altered. In this case, the program advances from the step S105 to a step S107. When the compression-resultant signal and the decryption-resultant signal are different from each other, the step S105 determines that the information "A" and the ID information for the second process in the received information "B" have been altered. In this case, the program advances from the step S105 to the step S106.

The step S106 sets an authentication-related flag to a state indicative of an authentication failure. After the step S106, the current execution of the program ends and then the program restarts from the step S101.

The step S107 extracts the ID information for the second process from the received information "B". The step S107 stores the extracted ID information for the second process into the RAM 108 for later use.

A step S109 subsequent to the step S107 generates a signal indicating an authentication success. The step S109 sends the authentication-success signal to the sink apparatus 200. The step S109 is followed by a next segment of the program.

Figure 7:
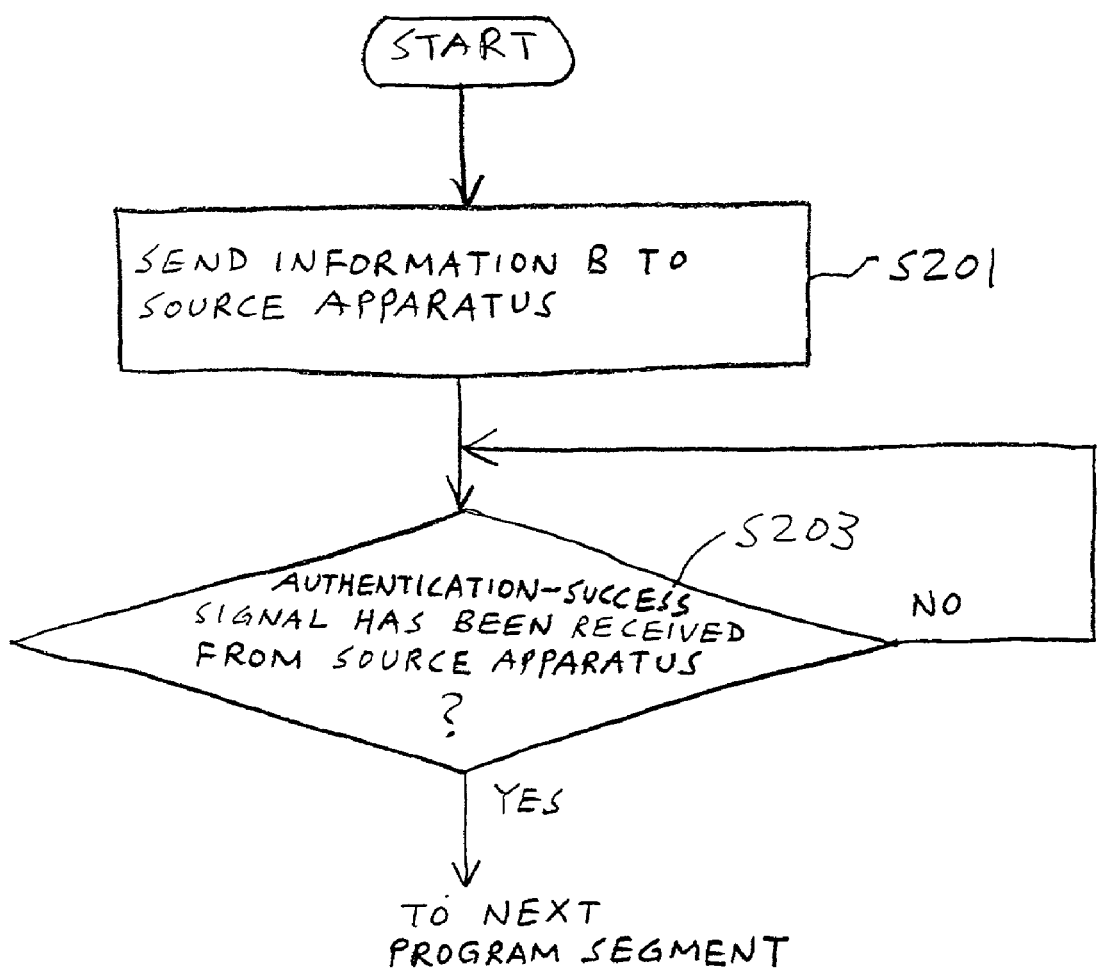
FIG. 7 is a flowchart of a first segment of a program for a CPU within the sink apparatus in FIG. 1.

As previously mentioned, the sink apparatus 200 (the CPU 204) operates in accordance with a program stored in the ROM 206. FIG. 7 is a flowchart of a segment of the program which is executed during the first process. As shown in FIG. 7, a first step S201 of the program segment sends the information "B" to the source apparatus 100. After the step S201, the program advances to a step S203.

As previously mentioned, the information "B" is provided in the storage device 210 of the sink apparatus 200. The information "B" contains the combination of the information "A" and the signal of the signature signA2 (see FIG. 4). The signal of the signature signA2 is generated from the information "A" through compression responsive to the one-way function and encryption responsive to the signal of the secret key Yprv which is previously given to the sink apparatus 200. Generating the signal of the signature signA2 and combining the generated signal of the signature signA2 with the information "A" may be implemented by the sink apparatus 200. Alternatively, the combination of the information "A" and the signal of the signature signA2 may be stored in the storage device 210 of the sink apparatus 200 in advance.

With reference back to FIG. 7, the step S203 decides whether or not the authentication-success signal has been received from the source apparatus 100. When the authentication-success signal has been received, the program advances from the step S203 to a next segment. Otherwise, the step S203 is repeated. Accordingly, the step S203 waits for the authentication-success signal.

Figure 8:
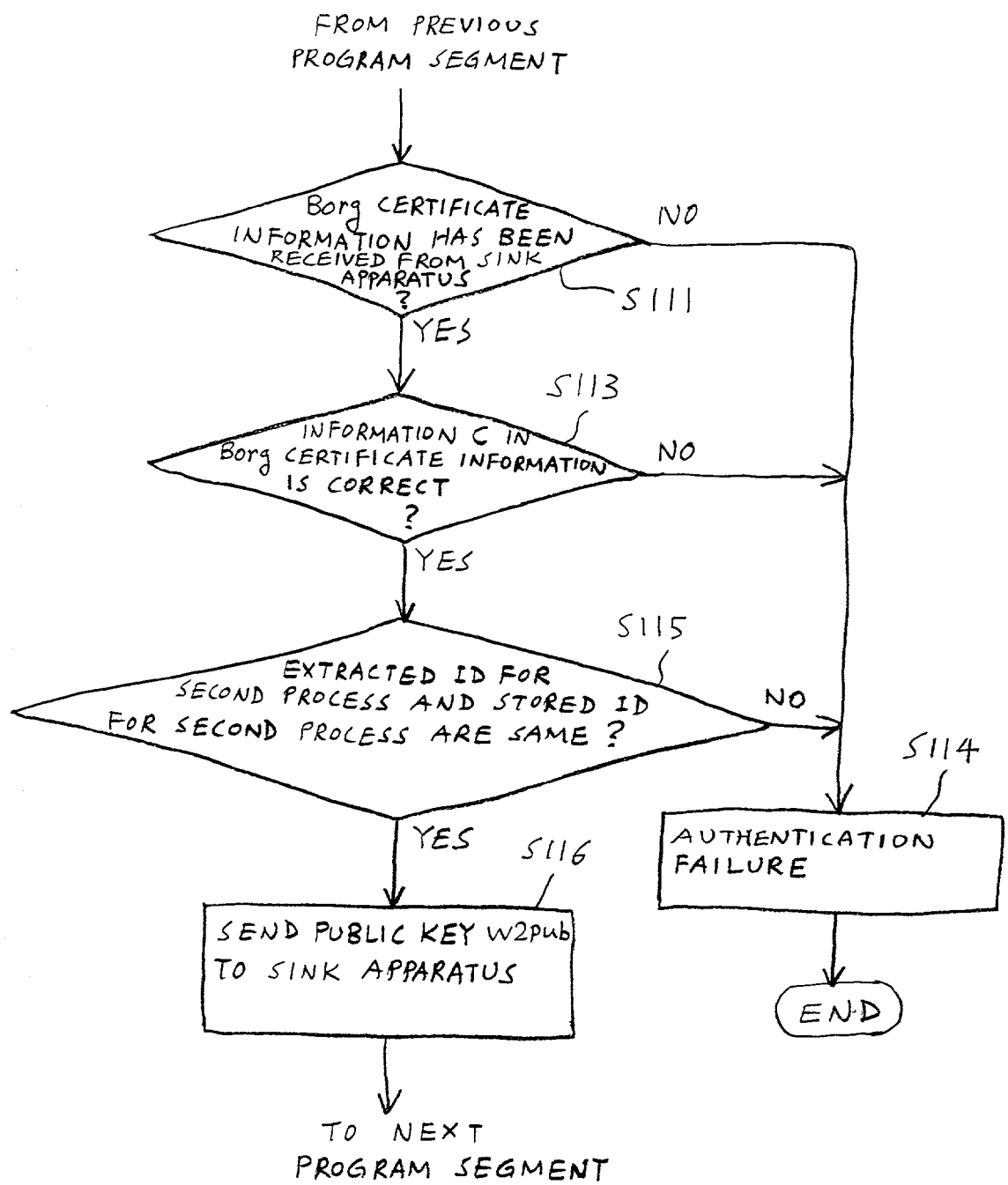
FIG. 8 is a flowchart of a second segment of the program for the CPU within the source apparatus in FIG. 1.

The second process follows the first process. FIG. 8 is a flowchart of a segment of the program for the source apparatus 100 (the CPU 104) which is executed during the second process. With reference to FIG. 8, a first step S111 of the program segment decides whether or not the "Borg" certificate information has been received from the sink apparatus 200. When the "Borg" certificate information has been received, the program advances from the step S111 to a step S113. The step S111 waits for the "Borg" certificate information in a predetermined time. In the case where the "Borg" certificate information is successfully received during the predetermined time, the program advances from the step S111 to the step S113. In the case where the "Borg" certificate information has not been received after the predetermined time elapses, the program advances from the step S111 to a step S114.

As previously mentioned, the "Borg" certificate information contains the combination of the information "C" and the signal of the signature signB1 (see FIG. 5). The signal of the signature signB1 is generated from the information "C" through the specified compression responsive to the one-way function and the specified operation (the encryption) responsive to the signal of the secret key Zprv. The information "C" contains the combination of the ID information for the second process and the signal of the public key W1pub. According to a first example of the combination, the ID information for the second process and the signal of the public key W1pub are sequentially arranged and connected. According to a second example of the combination, the ID information for the second process and the signal of the public key W1pub are divided into portions, and portions of the ID information and portions of the public-key signal are alternately arranged. A third example of the combination results from subjecting the ID information for the second process and the signal of the public key W1pub to predetermined operation.

With reference back to FIG. 8, the step S113 decides whether or not the information "C" in the received "Borg" certificate information has been altered. Specifically, the step S113 extracts the information "C" and the signal of the signature signB1 from the received "Borg" certificate information. As previously mentioned, the signal of the signature signB1 is generated by 1) subjecting the information "C" to specified compression (specified operation) responsive to a one-way function such as a hash function, and 2) encrypting the compression-resultant information into the signal of the signature signB1 in response to the signal of the secret key Zprv. The step S113 subjects the extracted information "C" to the specified compression responsive to the one-way function. The step S113 decrypts the extracted signal of the signature signB1 in response to the signal of the public key Zpub (the mate to the secret key Zprv). The step S113 compares the compression-resultant signal (the compression-resultant information) and the decryption-resultant signal. When the compression-resultant signal and the decryption-resultant signal are the same, the step S113 determines that the information "C" in the received "Borg" certificate information has not been altered. In this case, the program advances from the step S113 to a step S115. When the compression-resultant signal and the decryption-resultant signal are different from each other, the step S113 determines that the information "C" in the received "Borg" certificate information has been altered. In this case, the program advances from the step S113 to the step S114.

The step S115 reads the ID information for the second process from the RAM 108. The ID information for the second process has been stored in the RAM 108 by the step S107 (see FIG. 6) during the first process. The step S115 extracts the ID information for the second process from the received "Borg" certificate information. The step S115 collates the extracted ID information with the read ID information. When the extracted ID information and the read ID information are the same, the step S115 determines that authentication of the sink apparatus 200 has succeeded. In this case, the program advances from the step S115 to a step S116. When the extracted ID information and the read ID information are different from each other, the step S115 determines that authentication of the sink apparatus 200 has failed. In this case, the program advances from the step S115 to the step S114.

The step S114 sets the authentication-related flag to the state indicative of an authentication failure. After the step S114, the current execution of the program ends and then the program restarts from the step S101 (see FIG. 6).

The step S116 sends the signal of the public key W2pub to the sink apparatus 200. The step S116 may combine the signal of the public key W2pub and ID information for the source apparatus 100 (ID information for the second process which is provided in the source apparatus 100), and may generate a signal representative of a signature from the resultant combination in a way similar to the previously-mentioned way. In this case, the step S116 adds the generated signal of the signature to the combination of the signal of the public key W2pub and the ID information for the second process, and sends the resultant signature-added information to the sink apparatus 200. The step S116 is followed by a next segment of the program.

Figure 9:
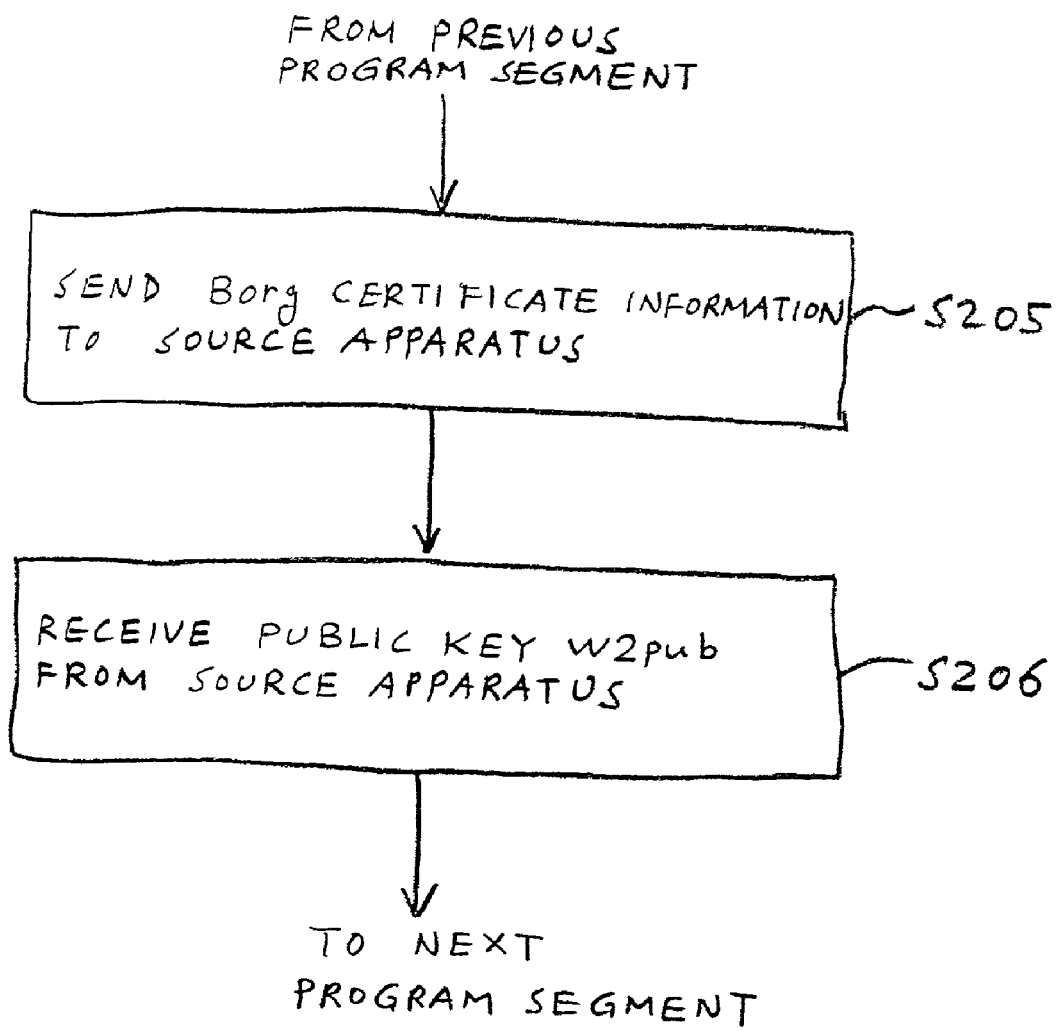
FIG. 9 is a flowchart of a second segment of the program for the CPU within the sink apparatus in FIG. 1.

FIG. 9 is a flowchart of a segment of the program for the sink apparatus 200 (the CPU 204) which is executed during the second process. As shown in FIG. 9, a first step S205 of the program segment sends the "Borg" certificate information to the source apparatus 100. The "Borg" certificate information contains the information "C", that is, the combination of the ID information for the second process and the signal of the public key W1pub (see FIG. 5). The "Borg"

certificate information also contains the signal of the signature signB1 for the information "C".

A step S206 subsequent to the step S205 receives the signal of the public key W2pub from the source apparatus 100. The step S206 waits for the signal of the public key W2pub if necessary. The step S206 is followed by a next segment of the program. As previously mentioned, the signal of the public key W2pub is sent from the source apparatus 100 after authentication of the sink apparatus 200 has succeeded.

In the case where the signature-added information containing the signal of the public key W2pub and the ID information for the second process (the ID information for the source apparatus 100) is sent from the source apparatus 100, the step S206 accepts the signature-added information. In this case, with respect to the received signature-added information, the sink apparatus 200 executes steps for authentication which are similar to the steps S111–S115 (FIG. 8) executed by the source apparatus 100. Thus, authentication of the sink apparatus 200 is implemented by the source apparatus 100, and authentication of the source apparatus 100 is implemented by the sink apparatus 200 during the second process. As understood from the previous description, the public key W1pub and the public key W2pub are exchanged between the source apparatus 100 and the sink apparatus 200 during the second process.

Figure 10:
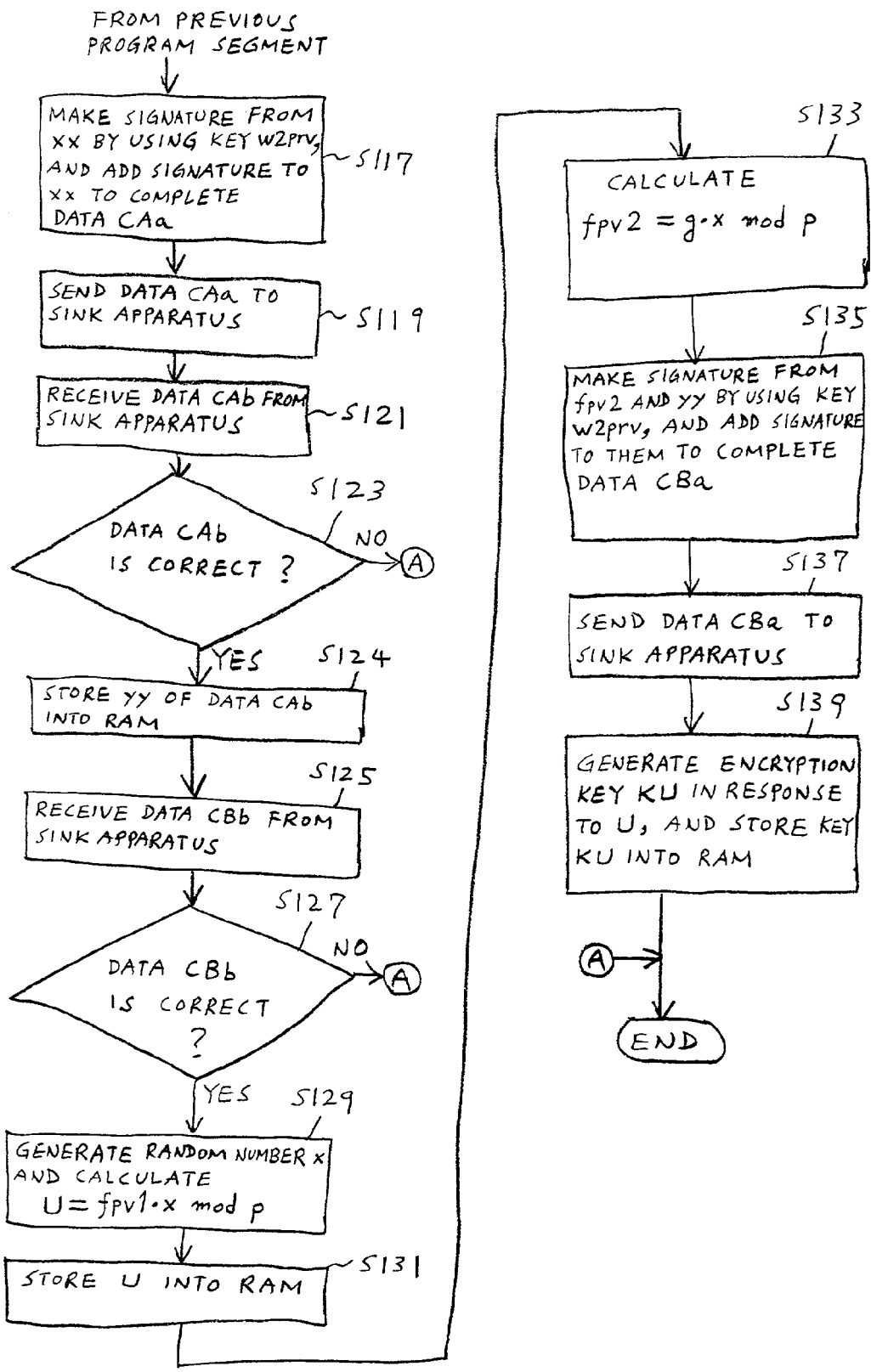
FIG. 10 is a flowchart of a third segment of the program for the CPU within the source apparatus in FIG. 1.

The key exchange process follows the second process. FIG. 10 is a flowchart of a segment of the program for the source apparatus 100 (the CPU 104) which is executed during the key exchange process. With reference to FIG. 10, a first step S117 of the program segment generates a signal representing a random number "xx". The step S117 uses the signal of the secret key W2prv which is previously given to the source apparatus 100. The step S117 encrypts the signal of the random number "xx" in response to the signal of the secret key W2prv, thereby generating a signal representing a random-number-related signature. The step S117 combines the signal of the random number "xx" and the signal of the random-number-related signature into a data piece CAa.

A step S119 following the step S117 sends the data piece CAa to the sink apparatus 200.

A step S121 subsequent to the step S119 receives a data piece CAb from the sink apparatus 200. As will be mentioned later, the data piece CAb contains a combination of a signal representative of a random number "yy" and a signal representative of a random-number-related signature.

A step S123 following the step S121 extracts the signal of the random number "yy" and the signal of the random-number-related signature from the received data piece CAb. The step S123 uses the signal of the public key W1pub which has been received from the sink apparatus 200 during the second process. The step S123 decrypts the extracted signal of the random-number-related signature in response to the signal of the public key W1pub, thereby reproducing a signal of a random number "yy". The step S123 compares the extracted random-number signal and the reproduced random-number signal. When the extracted random-number signal and the reproduced random-number signal are the same, the step S123 determines that the extracted random-number signal is correct. In this case, the program advances from the step S123 to a step S124. When the extracted random-number signal and the reproduced random-number signal are different from each other, the step S123 determines that the extracted random-number signal is wrong. In this case, the program exits from the step S123 and then the current execution of the program ends.

The step S124 stores the extracted signal of the random number "yy" into the RAM 108 for later use.

A step S125 subsequent to the step S124 receives a data piece CBb from the sink apparatus 200. As will be mentioned later, the data piece CBb contains a combination of a main signal and a signal representative of a main-related signature.

A step S127 following the step S125 extracts the main signal and the signal of the main-related signature from the received data piece CBb. The step S127 decrypts the extracted signal of the main-related signature in response to the signal of the public key W1pub, thereby reproducing a main signal. The step S127 compares the extracted main signal and the reproduced main signal. When the extracted main signal and the reproduced main signal are the same, the step S127 determines that the extracted main signal is correct. In this case, the program advances from the step S127 to a step S129. When the extracted main signal and the reproduced main signal are different from each other, the step S127 determines that the extracted main signal is wrong. In this case, the program exits from the step S127 and then the current execution of the program ends.

The step S129 generates a signal representing a random number "x". The step S129 extracts a signal of a value fpv1 (a first phase value generated by the sink apparatus 200) from the received data piece CBb. The step S129 uses a signal representative of a prime number "p" previously given in common to apparatuses including the source apparatus 100. The step S129 generates a signal representative of a value U by executing operation among the signal of the random number "x", the signal of the value fpv1, and the signal of the prime number "p" according to the following modulo-based equation.

$$U = \text{fpv1} \cdot x \bmod p \tag{1}$$

A step S131 subsequent to the step S129 stores the signal of the value U into the RAM 108 for later use.

A step S133 following the step S131 uses the signal of the random number "x" which is generated by the step S129. The step S133 also uses the signal of the prime number "p". The step S133 further uses a signal representative of a primitive element "g" previously given in common to apparatuses including the source apparatus 100. The step S133 generates a signal representative of a value fpv2 (a second phase value) by executing operation among the signal of the random number "x", the signal of the prime number "p", and the signal of the primitive element "g" according to the following modulo-based equation.

$$\text{fpv2} = g \cdot x \bmod p \tag{2}$$

As will be mentioned later, the second phase value fpv2 is used as a base for generating an encryption key.

A step S135 subsequent to the step S133 reads the signal of the random number "yy" from the RAM 108. The step S135 combines the signal of the value fpv2 and the signal of the random number "yy". The step S135 encrypts the combination-resultant signal in response to the signal of the secret key W2prv, thereby generating a signal representative of a related signature. The step S135 adds the signal of the signature to the combination-resultant signal, thereby completing a data piece CBa.

A step S137 following the step S135 sends the data piece CBa to the sink apparatus 200.

A step S139 subsequent to the step S137 reads the signal of the value U from the RAM 108. The step S139 generates a signal representative of an encryption key KU in response to the signal of the value U in a prescribed way. The step S139 stores the signal of the encryption key KU into the RAM 108 for later use. After the step S139, the current execution of the program ends.

Figure 11:
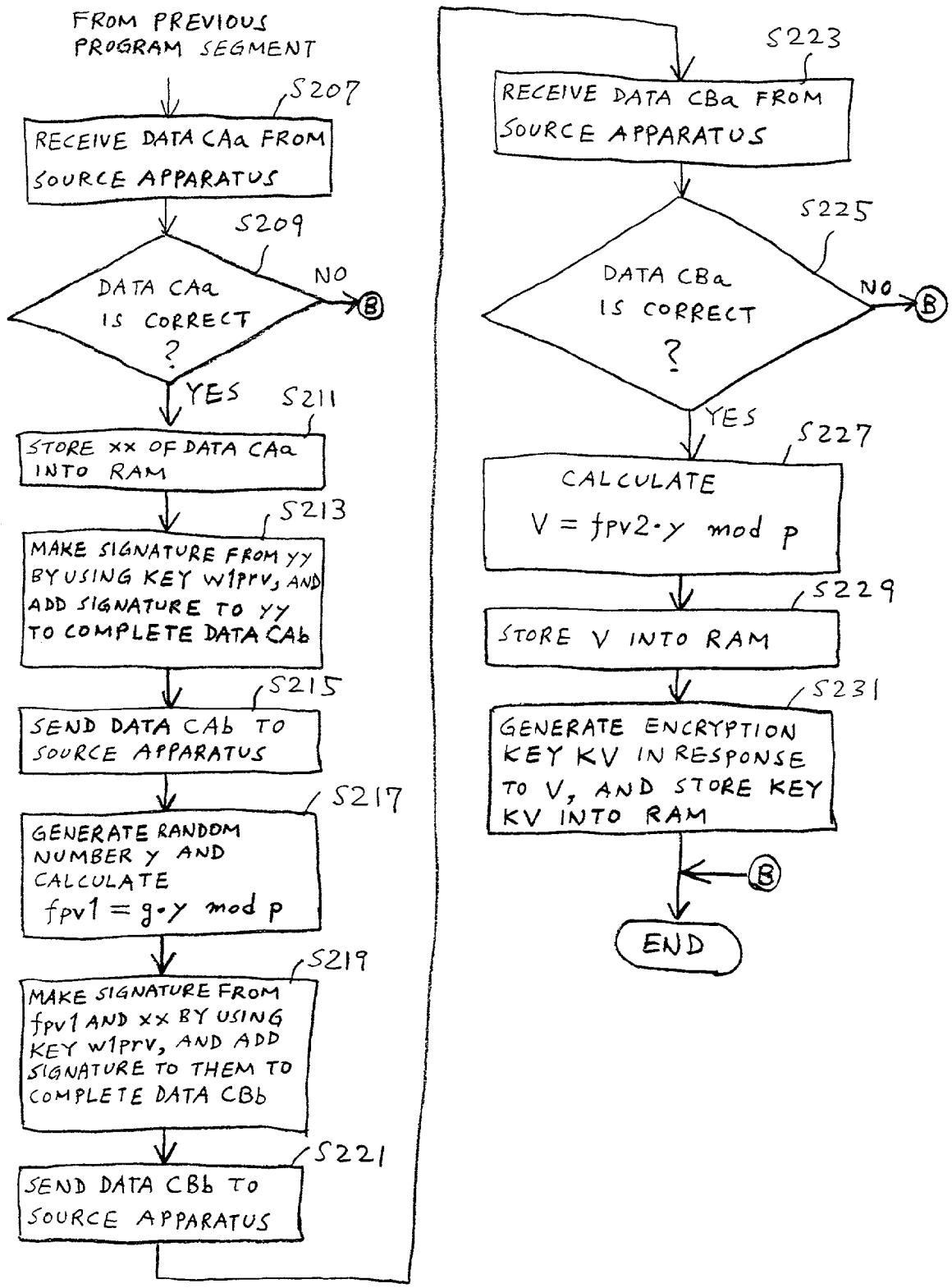
FIG. 11 is a flowchart of a third segment of the program for the CPU within the sink apparatus in FIG. 1.

FIG. 11 is a flowchart of a segment of the program for the sink apparatus 200 (the CPU 204) which is executed during the key exchange process. With reference to FIG. 11, a first step S207 of the program segment receives a data piece CAa from the source apparatus 100. The data piece CAa is sent from the source apparatus 100 by the step S119 in FIG. 10.

A step S209 following the step S207 extracts the signal of the random number "xx" and the signal of the random-number-related signature from the received data piece CAa. The step S209 uses the signal of the public key W2pub which has been received from the source apparatus 100 at the step S206 (see FIG. 9) during the second process. The step S209 decrypts the extracted signal of the random-number-related signature in response to the signal of the public key W2pub, thereby reproducing a signal of a random number "xx". The step S209 compares the extracted random-number signal and the reproduced random-number signal. When the extracted random-number signal and the reproduced random-number signal are the same, the step S209 determines that the extracted random-number signal is correct. In this case, the program advances from the step S209 to a step S211. When the extracted random-number signal and the reproduced random-number signal are different from each other, the step S209 determines that the extracted random-number signal is wrong. In this case, the program exits from the step S209 and then the current execution of the program ends.

The step S211 stores the extracted signal of the random number "xx" into the RAM 208 for later use.

A step S213 subsequent to the step S211 generates a signal representing a random number "yy". The step S213 uses the signal of the secret key W1prv which is previously given to the sink apparatus 200. The step S213 encrypts the signal of the random number "yy" in response to the signal of the secret key W1prv, thereby generating a signal representing a random-number-related signature. The step S213 combines the signal of the random number "yy" and the signal of the random-number-related signature into a data piece CAb.

A step S215 following the step S213 sends the data piece CAb to the source apparatus 100.

A step S217 subsequent to the step 3215 generates a signal representing a random number "y". The step S217 uses the signal of the prime number "p". The step S217 also uses the signal of the primitive element "g". The step S217 generates a signal representative of a value fpv1 (a first phase value) by executing operation among the signal of the random number "y", the signal of the prime number "p", and the signal of the primitive element "g" according to the following modulo-based equation.

$$fpv1 = g \cdot y \bmod p \quad (3)$$

As previously mentioned, the first phase value fpv1 is used as a base for generating an encryption key.

A step S219 following the step S217 reads the signal of the random number "xx" from the RAM 208. The step S219 combines the signal of the value fpv1 and the signal of the random number "xx". The step S219 encrypts the combination-resultant signal in response to the signal of the secret key W1prv, thereby generating a signal representative of a related signature. The step S219 adds the signal of the signature to the combination-resultant signal, thereby completing a data piece CBb.

A step S221 subsequent to the step S219 sends the data piece CBb to the source apparatus 100.

A first step S223 following the step S221 receives a data piece CBa from the source apparatus 100. The data piece CBa is sent from the source apparatus 100 by the step S137 in FIG. 10.

A step S225 following the step S223 extracts the combination of the signal of the random number "yy" and the signal of the value fpv2 from the received data piece CBa. The step S225 also extracts the signal of the signature from the received data piece CBa. The step S225 decrypts the extracted signal of the signature in response to the signal of the public key W2pub, thereby reproducing a combination-resultant signal. The step S225 compares the extracted combination-resultant signal and the reproduced combination-resultant signal. When the extracted combination-resultant signal and the reproduced combination-resultant signal are the same, the step S225 determines that the extracted combination-resultant signal is correct. In this case, the program advances from the step S225 to a step S227. When the extracted combination-resultant signal and the reproduced combination-resultant signal are different from each other, the step S225 determines that the extracted combination-resultant signal is wrong. In this case, the program exits from the step S225 and then the current execution of the program ends.

The step S227 extracts the signal of the value fpv2 (the second phase value generated by the source apparatus 100) from the received data piece CBa. The step S227 uses the signal of the random number "y". The step S227 also uses the signal of the prime number "p". The step S227 generates a signal representative of a value V by executing operation among the signal of the random number "y", the signal of the value fpv2, and the signal of the prime number "p" according to the following modulo-based equation.

$$V = fpv2 \cdot y \bmod p \quad (4)$$

A step S229 subsequent to the step S227 stores the signal of the value V into the RAM 208 for later use.

A step S231 following the step S229 reads the signal of the value V from the RAM 208. The step S231 generates a signal representative of an encryption key KV in response to the signal of the value V in a prescribed way. The step S231 stores the signal of the encryption key KV into the RAM 208 for later use. After the step S231, the current execution of the program ends.

Figure 12:
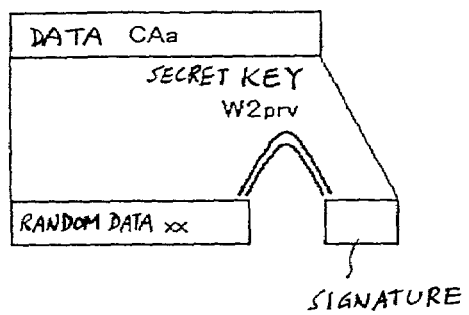
FIG. 12 is a diagram of the structure of a data piece CAa.

With reference to FIG. 12, the data piece CAa contains the combination of the signal of the random number "xx" and the signal of the random-number-related signature. Specifically, the signal of the random number "xx" is encrypted in response to the signal of the secret key W2prv, thereby being converted into the signal of the random-number-related signature. The signal of the random number "xx" and the signal of the random-number-related signature are combined into the data piece CAa.

Figure 13:
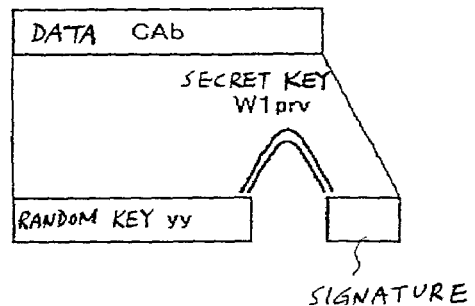
FIG. 13 is a diagram of the structure of a data piece CAb.

With reference to FIG. 13, the data piece CAb contains the combination of the signal of the random number "yy" and the signal of the random-number-related signature. Specifically, the signal of the random number "yy" is encrypted in response to the signal of the secret key W1prv, thereby being converted into the signal of the random-number-related signature. The signal of the random number "yy" and the signal of the random-number-related signature are combined into the data piece CAb.

Figure 14:
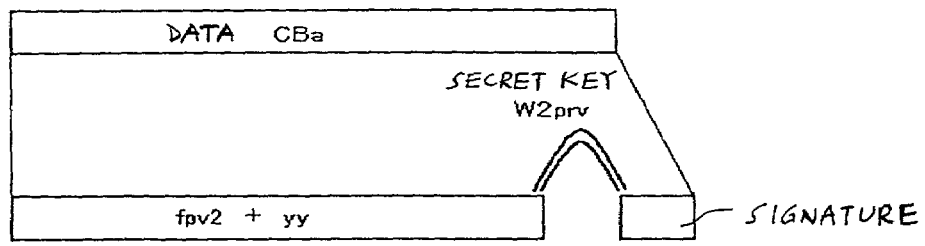
FIG. 14 is a diagram of the structure of a data piece CBa.

With reference to FIG. 14, the data piece CBa contains the combination of the signal of the value fpv2 and the signal of the random number "yy". The data piece CBa also contains the signal of the signature for the combination of the signal of the value fpv2 and the signal of the random number "yy". Specifically, the signal of the value fpv2 and the signal of the random number "yy" are combined. The combination-resultant signal is encrypted in response to the signal of the secret key W2prv, thereby being converted into the signal of the related signature. The signal of the signature is added to the combination-resultant signal, thereby completing the data piece CBa.

Figure 15:
FIG. 15 is a diagram of the structure of a data piece CBb.

With reference to FIG. 15, the data piece CBb contains the combination of the signal of the value fpv1 and the signal of the random number "xx". The data piece CBb also contains the signal of the signature for the combination of the signal of the value fpv1 and the signal of the random number "xx". Specifically, the signal of the value fpv1 and the signal of the random number "xx" are combined. The combination-resultant signal is encrypted in response to the signal of the secret key W1prv, thereby being converted into the signal of the related signature. The signal of the signature is added to the combination-resultant signal, thereby completing the data piece CBb.

As a result of the key exchange process, the signal of the value U and the signal of the value V are provided in the source apparatus 100 and the sink apparatus 200 respectively. It is known in the art that the signal of the value U and the signal of the value V are the same. The source apparatus 100 generates the signal of the encryption key KU in response to the signal of the value U in the prescribed way. The sink apparatus 200 generates the signal of the encryption key KV in response to the signal of the value V in the prescribed way. The source apparatus 100 encrypts original contents information in response to the signal of the encryption key KU. The source apparatus 100 sends the encryption-resultant contents information to the sink apparatus 200. The sink apparatus 200 uses the signal of the encryption key KV as a decryption key. The sink apparatus 200 decrypts the encryption-resultant contents information into the original contents information in response to the decryption key. In this way, the sink apparatus 200 reproduces the original contents information. As understood from the above description, only the sink apparatus 200 which has the signal of the value V same as the signal of the value U can reproduce the original contents information.

The above-mentioned generation of the values U and V is based on the Diffie-Hellman method. The generation of the values U and V may be based on one of other methods.

Figure 16:
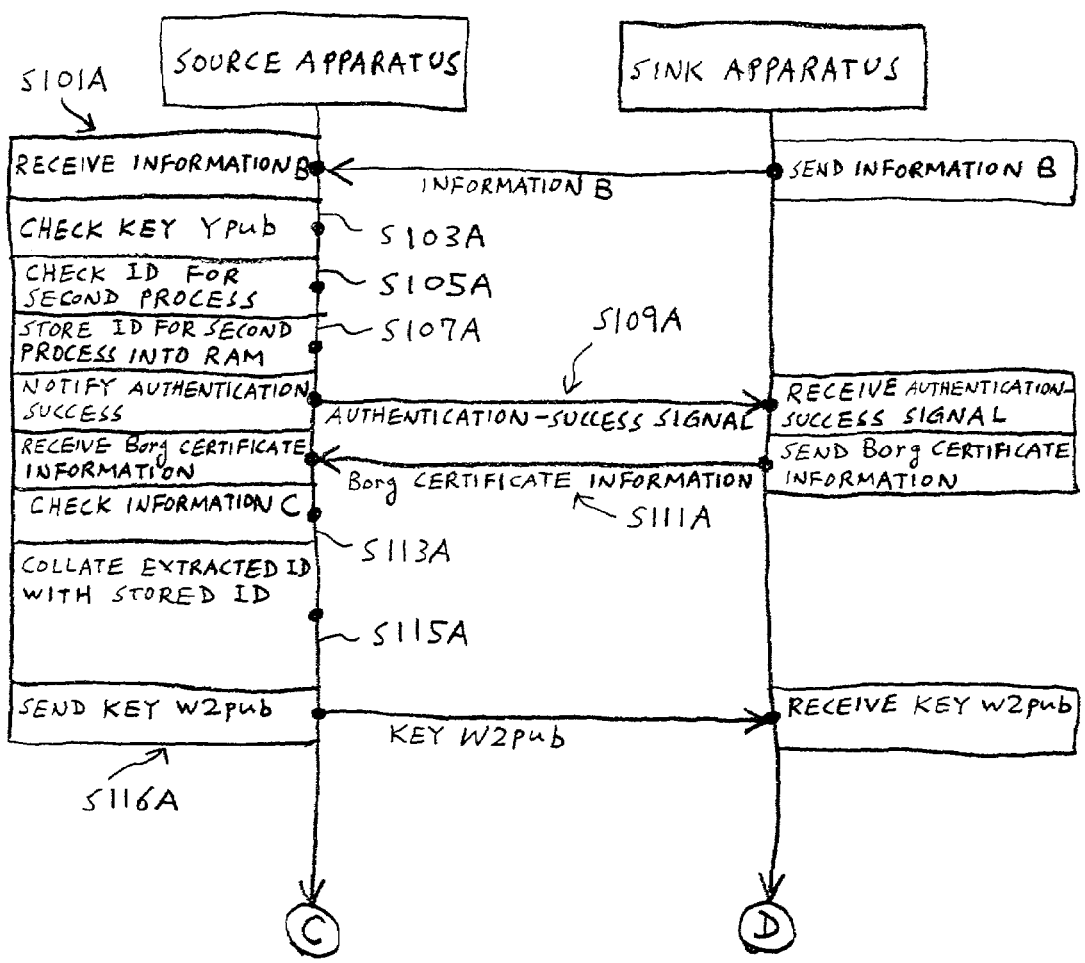
FIGS. 16 and 17 compose a diagram showing a sequence of stages of operation of the source apparatus and the sync apparatus in FIG. 1.
Figure 17:
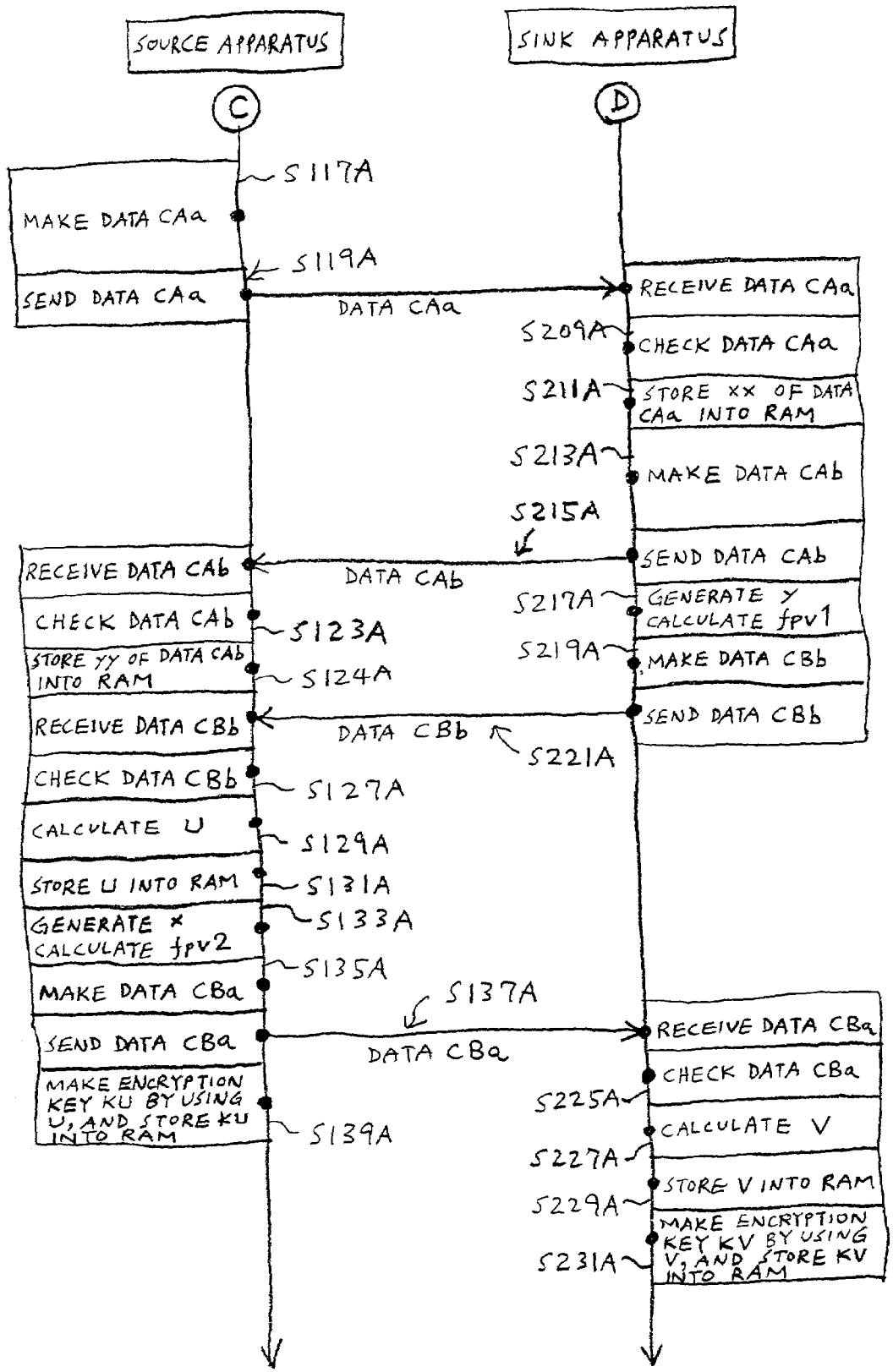

FIGS. 16 and 17 show a sequence of stages of operation of the source apparatus 100 and the sync apparatus 200 which occurs during the first process, the second process, and the key exchange process. With reference to FIGS. 16 and 17, at a first stage S101A, the sink apparatus 200 sends the information "B" to the source apparatus 100. At the first stage S101A, the source apparatus 100 receives the information "B". The first stage S101A corresponds to the step S101 in FIG. 6 and the step S201 in FIG. 7.

At a stage S103A following the stage S101A, the source apparatus 100 checks the signal of the public key Ypub in the received information "B". The stage S103A corresponds to the step S103 in FIG. 6.

At a stage S105A subsequent to the stage S103A, the source apparatus 100 checks the ID information for the second process in the received information "B". The stage S105A corresponds to the step S105 in FIG. 6.

At a stage S107A following the stage S105A, the source apparatus 100 extracts the ID information for the second process from the received information "B". At the stage S107A, the extracted ID information for the second process is stored into the RAM 108 for later use. The stage S107A corresponds to the step S107 in FIG. 6.

At a stage S109A subsequent to the stage S107A, the source apparatus 100 generates a signal indicating an authentication success. At the stage S109A, the source apparatus 100 sends the authentication-success signal to the sink apparatus 200. At the stage S109A, the sink apparatus 200 receives the authentication-success signal. The stage S109A corresponds to the step S109 in FIG. 6 and the step S203 in FIG. 7.

At a stage S111A following the stage S109A, the sink apparatus 200 sends the "Borg" certificate information to the source apparatus 100. At the stage S111A, the source apparatus 100 receives the "Borg" certificate information. The stage S111A corresponds to the step S111 in FIG. 8 and the step S205 in FIG. 9.

At a stage S113A subsequent to the stage S111A, the source apparatus 100 checks the information "C" in the received "Borg" certificate information. The stage S113A corresponds to the step S113 in FIG. 8.

At a stage S115A following the stage S113A, in the source apparatus 100, the ID information for the second process is read from the RAM 108. The ID information for the second process has been stored in the RAM 108 at the stage S107A. At the stage S115A, in the source apparatus 100, the ID information for the second process is extracted from the received "Borg" certificate information. At the stage S115A, the source apparatus 100 collates the extracted ID information with the read ID information. The stage S115A corresponds to the step S115 in FIG. 8.

At a stage S116A subsequent to the stage S115A, the source apparatus 100 sends the signal of the public key W2pub to the sink apparatus 200. At the stage S116A, the sink apparatus 200 receives the signal of the public key W2pub. The stage S116A corresponds to the step S116 in FIG. 8 and the step S206 in FIG. 9.

At a stage S117A following the stage S116A, the source apparatus 100 encrypts the signal of the random number "xx" in response to the signal of the secret key W2prv, thereby generating a signal representing a random-number-related signature. At the stage S117A, the source apparatus 100 combines the signal of the random number "xx" and the signal of the random-number-related signature into a data piece CAa. The stage S117A corresponds to the step S117 in FIG. 10.

At a stage S119A subsequent to the stage S117A, the source apparatus 100 sends the data piece CAa to the sink apparatus 200. At the step S119A, the sink apparatus 200 receives the data piece CAa. The stage S119A corresponds to the step S119 in FIG. 10 and the step S207 in FIG. 11.

At a stage S209A following the stage S119A, the sink apparatus 200 extracts the signal of the random number "xx" and the signal of the random-number-related signature from the received data piece CAa. At the stage S209A, the sink apparatus 200 checks the extracted random-number signal in response to the extracted signal of the random-number-related signature. The stage S209A corresponds to the step S209 in FIG. 11.

At a stage S211A subsequent to the stage S209A, in the sink apparatus 200, the extracted signal of the random number "xx" is stored into the RAM 208 for later use. The stage S211A corresponds to the step S211 in FIG. 11.

At a stage S213A following the stage 5211A, the sink apparatus 200 encrypts the signal of the random number "yy" in response to the signal of the secret key W1prv, thereby generating a signal representing a random-number-related signature. At the stage S213A, the sink apparatus 200 combines the signal of the random number "yy" and the signal of the random-number-related signature into a data piece CAb. The stage S213A corresponds to the step S213 in FIG. 11.

At a stage S215A subsequent to the stage S213A, the sink apparatus 200 sends the data piece CAb to the source apparatus 100. At the stage S215A, the source apparatus 100 receives the data piece CAb. The stage S215A corresponds to the step S121 in FIG. 10 and the step S215 in FIG. 11.

At a stage S217A following the stage S215A, the sink apparatus 200 generates a signal representing a random number "y". At the stage S217A, the sink apparatus 200 generates the signal of the value fpv1 in response to the the random number "y". The stage S217A corresponds to the step S217 in FIG. 11.

A stage S219A subsequent to the stage S217A generates a data piece CBb in response to the signal of the value fpv1. The stage S219A corresponds to the step S219 in FIG. 11.

On the other hand, at a stage S123A following the stage S215A, the source apparatus 100 extracts the signal of the random number "yy" and the signal of the random-number-related signature from the received data piece CAb. At the stage S123A, the source apparatus 100 checks the extracted random-number signal in response to the extracted signal of the random-number-related signature. The stage S123A corresponds to the step S123 in FIG. 10.

At a stage S124A subsequent to the stage S123A, in the source apparatus 100, the extracted signal of the random number "yy" is stored into the RAM 108 for later use. The stage S124A corresponds to the step S124 in FIG. 10.

At a stage S221A following the stages S219A and S124A, the sink apparatus 200 sends the data piece CBb to the source apparatus 100. At the step S221A, the source apparatus 100 receives the data piece CBb. The stage S221A corresponds to the step S125 in FIG. 10 and the step S221 in FIG. 11.

At a stage S127A subsequent to the stage S221A, the source apparatus 100 extracts the main signal and the signal of the main-related signature from the received data piece CBb. At the stage S127A, the source apparatus 100 checks the extracted main signal in response to the extracted signal of the main-related signature. The stage S127A corresponds to the step S127 in FIG. 10.

At a stage S129A following the stage S127A, the source apparatus 100 extracts the signal of the value fpv1 from the received data piece CBb. At the stage S129A, the source apparatus 100 generates a signal representative of a random number "x". At the stage S129A, the source apparatus 100 generates the signal of the value U in response to the signal of the value fpv1 and the signal of the random number "x". The stage S129A corresponds to the step S129 in FIG. 10.

At a stage S131A subsequent to the stage S129A, in the source apparatus 100, the signal of the value U is stored into the RAM 108 for later use. The stage S131A corresponds to the step S131 in FIG. 10.

At a stage S133A following the stage S131A, the source apparatus 100 generates a signal representative of a value fpv2 in response to the signal of the random number "x". The stage S133A corresponds to the step S133 in FIG. 10.

At a stage S135A subsequent to the stage S133A, the source apparatus 100 generates a data piece CBa in response to the signal of the value fpv2. The stage S135A corresponds to the step S135 in FIG. 10.

At a stage S137A following the stage S135A, the source apparatus 100 sends the data piece CBa to the sink apparatus 200. At the stage S137A, the sink apparatus 200 receives the data piece CBa. The stage S137A corresponds to the step S137 in FIG. 10 and the step S223 in FIG. 11.

At a stage S139A subsequent to the stage S137A, in the source apparatus 100, the signal of the value U is read from the RAM 108. At the stage S139A, the source apparatus 100 generates a signal representative of an encryption key KU in response to the signal of the value U. At the stage S139A, in the source apparatus 100, the signal of the encryption key KU is stored into the RAM 108 for later use. The stage S139A corresponds to the step S139 in FIG. 10.

On the other hand, at a stage S225A following the stage S137A, the sink apparatus 200 extracts the combination of the signal of the random number "yy" and the signal of the value fpv2 from the received data piece CBa. At the step S225A, the sink apparatus 200 also extracts the signal of the signature from the received data piece CBa. At the step S225A, the sink apparatus 200 checks the extracted combination-resultant signal in response to the extracted signal of the signature. The step S225A corresponds to the step S225 in FIG. 11.

At a stage S227A subsequent to stage S225A, the sink apparatus 200 extracts the signal of the value fpv2 from the received data piece CBa. At the stage S227A, the sink apparatus 200 generates a signal representative of a value V in response to the signal of the value fpv2. The stage S227A corresponds to the step S227 in FIG. 11.

At a stage S229A following the stage S227A, in the sink apparatus 200, the signal of the value V is stored into the RAM 208 for later use. The stage S229A corresponds to the step S229 in FIG. 11.

At a stage S231A subsequent to the stage S229A, in the sink apparatus 200, the signal of the value V is read from the RAM 208. At the stage S231A, the sink apparatus 200 generates a signal representative of an encryption key KV in response to the signal of the value V. At the stage S231A, in the sink apparatus 200, the signal of the encryption key KV is stored into the RAM 208 for later use. The stage S231A corresponds to the step S231 in FIG. 11.

The system of FIG. 1 provides enhanced reliability of authentication as follows. It is assumed that there is an illegal sink apparatus which has received a licence from the management organ Borg but which does not have received any licence from the management organ Aorg. The illegal sink apparatus behaves like a legitimate sink apparatus. A consideration is given of the case where the illegal sink apparatus steals information "B" transmitted from a legitimate sink apparatus to a legitimate source apparatus during the first process, and the illegal sink apparatus tries to get authentication from the legitimate source apparatus by use of the stolen information "B".

When the illegal sink apparatus uses the stolen information "B" as it is and then the illegal sink apparatus sends the stolen information "B" to the legitimate source apparatus as correct information "B", the legitimate source apparatus receives the sent information "B" and normally responds to the received information "B" in the first process since the received information "B" is the same as the original information "B". Specifically, the "Aorg" certificate information in the received information (the stolen information) "B" which contains the ID information for the second process is correct. Therefore, in the first process, the legitimate source apparatus decides that the information "B" in question comes from a legitimate sink apparatus.

When the illegal sink apparatus changes the ID information for the second process in the stolen information "B" into one assigned to the illegal sink apparatus and then the illegal sink apparatus sends the change-resultant information "B" to the legitimate source apparatus as correct information "B", the legitimate source apparatus receives the sent information "B" and does not normally respond to the received information "B" in the first process since the received information "B" differs from the original information "B". Specifically, the ID information for the second process in the received information (the stolen information) "B" differs from one in the original information "B". Therefore, the legitimate source apparatus determines that the ID information for the second process in the received information "B" has been altered (see the step S105 in FIG. 6). Thus, in the first process, the legitimate source apparatus decides that the information "B" in question comes from an illegal sink apparatus.

A consideration is given of the case where the illegal sink apparatus steals "Borg" certificate information transmitted from a legitimate sink apparatus to a legitimate source apparatus during the second process, and the illegal sink apparatus tries to get authentication from the legitimate source apparatus by use of the stolen "Borg" certificate information.

When the illegal sink apparatus uses the stolen "Borg" certificate information as it is and then the illegal sink apparatus sends the stolen "Borg" certificate information to the legitimate source apparatus as correct "Borg" certificate information, the legitimate source apparatus receives the sent "Borg" certificate information and normally responds to the received "Borg" certificate information in the second process since the received "Borg" certificate information is the same as the original "Borg" certificate information. Specifically, the ID information for the second process and the signal of the public key W1pub in the received "Borg" certificate information (the stolen "Borg" certificate information) are correct. Therefore, in the second process, the legitimate source apparatus decides that the "Borg" certificate information in question comes from a legitimate sink apparatus.

When the illegal sink apparatus changes the ID information for the second process in the stolen "Borg" certificate information into one assigned to the illegal sink apparatus and then the illegal sink apparatus sends the change-resultant "Borg" certificate information to the legitimate source apparatus as correct "Borg" certificate information, the legitimate source apparatus receives the sent "Borg" certificate information and does not normally respond to the received "Borg" certificate information in the second process since the received "Borg" certificate information differs from the original "Borg" certificate information. Specifically, the ID information for the second process in the received "Borg" certificate information (the stolen "Borg" certificate information) differs from one in the original "Borg" certificate information. Therefore, the legitimate source apparatus determines that the ID information for the second process in the received "Borg" certificate information has been altered (see the step S115 in FIG. 8). Thus, in the second process, the legitimate source apparatus decides that the "Borg" certificate information in question comes from an illegal sink apparatus.

During the third process (the key exchange process), the legitimate source apparatus decides that the sink apparatus which is seeking authentication is illegal as follows. The illegal sink apparatus generates a signal representing a random number "yy" (see the step S213 in FIG. 11). The illegal sink apparatus uses a signal representative of a wrong secret key W1prv which differs from that given to the legitimate sink apparatus. The illegal sink apparatus encrypts the signal of the random number "yy" in response to the signal of the wrong secret key W1prv, thereby generating a signal representing a wrong random-number-related signature. The illegal sink apparatus combines the signal of the random number "yy" and the signal of the wrong random-number-related signature into a wrong data piece CAb. The illegal sink apparatus sends the wrong data piece CAb to the legitimate source apparatus. The legitimate source apparatus receives the wrong data piece CAb. The legitimate source apparatus extracts the signal of the random number "yy" and the signal of the wrong random-number-related signature from the received wrong data piece CAb (see the step S123 in FIG. 10). The legitimate source apparatus uses the signal of the public key W1pub which is the mate to the correct secret key W1prv rather than the wrong secret key W1prv. The legitimate source apparatus decrypts the extracted signal of the wrong random-number-related signature in response to the signal of the public key W1pub, thereby reproducing a signal of a random number "yy". The legitimate source apparatus compares the extracted random-number signal and the reproduced random-number signal. Since the reproduced random-number signal results from the decryption of the wrong signature, the extracted random-number signal and the reproduced random-number signal are different from each other. Therefore, the legitimate source apparatus determines that the reproduced random-number signal is wrong. Thus, the legitimate source apparatus decides that the sink apparatus which is seeking authentication is illegal.

Second Embodiment

A second embodiment of this invention is similar to the first embodiment thereof except for design changes mentioned later. According to the second embodiment of this invention, a specified management organ selects one from among different-level reliabilities related to at least one of copyright protection and information secrecy. The specified management organ assigns the selected reliability to each of apparatuses including sink apparatuses. The specified management organ gives information representative of the assigned reliability to the apparatus. In the second embodiment of this invention, the sink apparatus 200 sends information of an assigned reliability to the source apparatus 100. The reliability assignment and the reliability-information transmission may be based on a system shown in U.S. patent application Ser. No. 09/748,176, filed on Dec. 27, 2000 (corresponding to European patent application number 01300038.5, filed on Jan. 4, 2001), the disclosure of which is hereby incorporated by reference.

In the second embodiment of this invention, the step S201 (see FIG. 7) sends the information "B" and the information of the reliability to the source apparatus 100.

In the case where the specified management organ is the same as the management organ Aorg, the information of the reliability may be added to the information "B". Specifically, a combination (or a compression-resultant combination) of the signal of the public key Ypub and the information of the reliability is encrypted into a signal of a signature signal in response to the signal of the secret key Xprv. The signal of the signature signA1 is added to the combination (or the compression-resultant combination) of the signal of the public key Ypub and the information of the reliability to complete "Aorg"certificate information.

The source apparatus 100 has a signal representative of a reference reliability. Between the steps S105 and S107 (see FIG. 6), there is provided a step of getting the reliability of the sink apparatus 200 from the received information, and comparing the reliability of the sink apparatus 200 with the reference reliability. When the reliability of the sink apparatus 200 is lower than the reference reliability, the present step determines that contents information should not be sent to the sink apparatus 200. In this case, the program advances from the present step to the step S106 (see FIG. 6). When the reliability of the sink apparatus 200 is equal to or higher than the reference reliability, the program advances from the present step to the step S107 (see FIG. 6).

Third Embodiment

A third embodiment of this invention is similar to the first embodiment thereof except for design changes mentioned later. According to the third embodiment of this invention, the source apparatus 100 has "Aorg" certificate information given by the management organ Aorg. The source apparatus 100 also has a signal representative of a secret key Yprv. Therefore, the source apparatus 100 can generate a signal representative of a signature signA2 from information "A" in response to the signal of the secret key Yprv.

In the third embodiment of this invention, the step S109 (see FIG. 6) sends the source-apparatus "Aorg" certificate information to the sink apparatus 200 instead of the authentication-success signal. The sink apparatus 200 responds to the received source-apparatus "Aorg" certificate information, and thereby implements steps for authentication of the source apparatus 100 which are similar to the steps S101–S107 (see FIG. 6).

Fourth Embodiment

A fourth embodiment of this invention is similar to the first embodiment thereof except for design changes mentioned later. According to the fourth embodiment of this invention, the second process is repetitively implemented at a predetermined time period during the transmission of contents information from the source apparatus 100 to the sink apparatus 200.

During every implementation of the second process, the step S115 (see FIG. 8) reads the ID information for the second process from the RAM 108. The ID information for the second process has been stored in the RAM 108 by the step S107 (see FIG. 6) during the first process. During every implementation of the second process, the step S115 extracts the ID information for the second process from the received "Borg" certificate information. The step S115 collates the extracted ID information with the read ID information for authentication of the sink apparatus 200.

Fifth Embodiment

Figure 18:
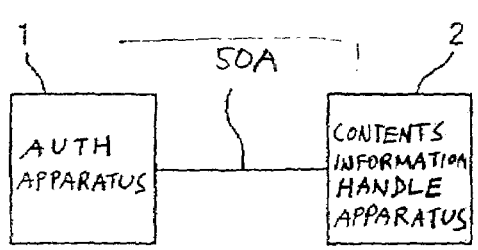
FIG. 18 is a block diagram of a contents-information transmission system according to a fifth embodiment of this invention.

FIG. 18 shows a contents-information transmission system according to a fifth embodiment of this invention. The system of FIG. 18 includes an authentication apparatus 1 and a contents-information handling apparatus 2 which are connected to each other via a transmission medium 50A. The authentication apparatus 1 includes the source apparatus in one of the first to fourth embodiments of this invention. The contents-information handling apparatus 2 includes the sink apparatus in one of the first to fourth embodiments of this invention. The transmission medium 50A includes a transmission line of an IEEE1394 type.

Sixth Embodiment

Figure 19:
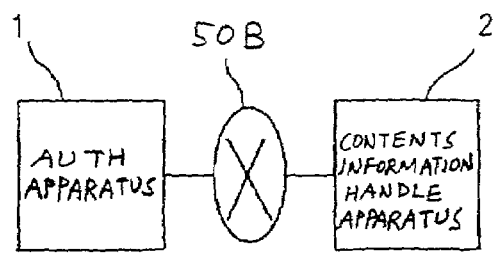
FIG. 19 is a block diagram of a contents-information transmission system according to a sixth embodiment of this invention.

FIG. 19 shows a contents-information transmission system according to a sixth embodiment of this invention. The system of FIG. 19 includes an authentication apparatus 1 and a contents-information handling apparatus 2 which are connected to each other via a transmission medium SOB. The authentication apparatus 1 includes the source apparatus in one of the first to fourth embodiments of this invention. The contents-information handling apparatus 2 includes the sink apparatus in one of the first to fourth embodiments of this invention. The transmission medium 50B includes a communication network such as the Internet.

Seventh Embodiment

Figure 20:
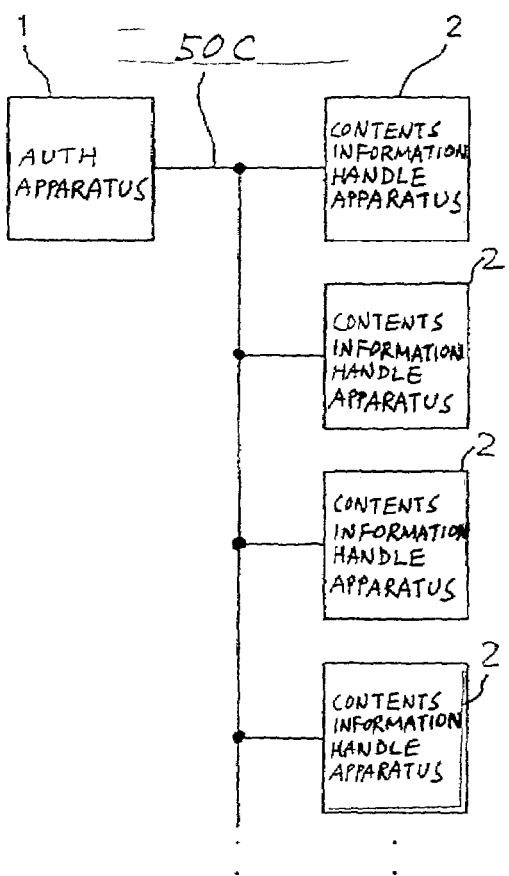
FIG. 20 is a block diagram of a contents-information transmission system according to a seventh embodiment of this invention.

FIG. 20 shows a contents-information transmission system according to a seventh embodiment of this invention. The system of FIG. 20 includes an authentication apparatus 1 and a plurality of contents-information handling apparatuses 2. The authentication apparatus 1 is connected to the contents-information handling apparatuses 2 via a transmission medium 50C. The authentication apparatus 1 includes the source apparatus in one of the first to fourth embodiments of this invention. Each of the contents-information handling apparatuses 2 includes the sink apparatus in one of the first to fourth embodiments of this invention. The transmission medium 50C includes transmission lines of the IEEE1394 type.

Eighth Embodiment

Figure 21:
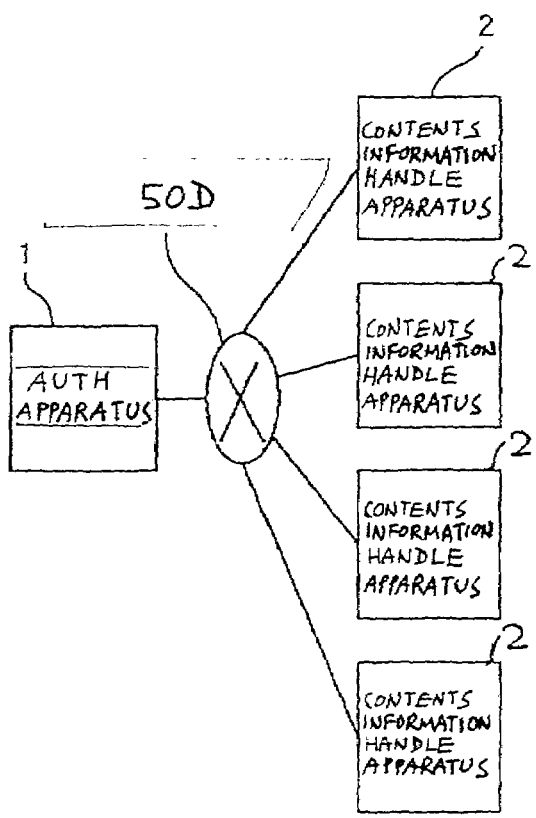
FIG. 21 is a block diagram of a contents-information transmission system according to an eighth embodiment of this invention.

FIG. 21 shows a contents-information transmission system according to an eighth embodiment of this invention. The system of FIG. 21 includes an authentication apparatus 1 and a plurality of contents-information handling apparatuses 2. The authentication apparatus 1 is connected to the contents-information handling apparatuses 2 via a transmission medium 50D. The authentication apparatus 1 includes the source apparatus in one of the first to fourth embodiments of this invention. Each of the contents-information handling apparatuses 2 includes the sink apparatus in one of the first to fourth embodiments of this invention. The transmission medium 50D includes a communication network such as the Internet.

What is claimed is:

1. A method of authentication, comprising the steps of:
  a) sending first information from a contents-information receiver apparatus to a contents-information sender apparatus, the first information including a combination of certificate information representative of presence of a license granted to the contents-information receiver apparatus and identification information for identifying the contents-information receiver apparatus, the first information further including a signal of a signature for the combination of the certificate information and the identification information;
  b) in the contents-information sender apparatus, determining whether the combination of the certificate information and the identification information in the first information sent by the step a) is correct or wrong in response to the signal of the signature in the first information;

c) in the contents-information sender apparatus, extracting the identification information from the first information sent by the step a) and storing the extracted identification information;

d) sending the identification information from the contents-information receiver apparatus to the contents-information sender apparatus at a time different from a time of the step a); and e) in the contents-information sender apparatus, collating the identification information sent by the step d) with the identification information stored by the step c).

2. A method as recited in claim 1, wherein the certificate information contains information of a reliability of the contents-information receiver apparatus.

3. A contents-information sender apparatus comprising:

first means for receiving first information from a contents-information receiver apparatus, the first information including a combination of certificate information representative of presence of a license granted to the contents-information receiver apparatus and identification information for identifying the contents-information receiver apparatus, the first information further including a signal of a signature for the combination of the certificate information and the identification information;

second means for determining whether the combination of the certificate information and the identification information in the first information received by the first means is correct or wrong in response to the signal of the signature in the first information;

third means for extracting the identification information from the first information received by the first means and storing the extracted identification information;

fourth means for receiving the identification information from the contents-information receiver apparatus at a time different from a time of receiving by the first means; and fifth means for collating the identification information received by the fourth means with the identification information stored by the third means.

4. A contents-information sender apparatus as recited in claim 3, wherein the certificate information contains information of a reliability of the contents-information receiver apparatus.

5. A contents-information receiver apparatus comprising:

first means for sending first information to a contents-information sender apparatus, the first information including a combination of certificate information representative of presence of a license granted to the contents-information receiver apparatus and identification information for identifying the contents-information receiver apparatus, the first information further including a signal of a signature for the combination of the certificate information and the identification information; and second means for sending the identification information to the contents-information sender apparatus at a time different from a time of sending by the first means.

6. A contents-information receiver apparatus as recited in claim 5, wherein the certificate information contains information of a reliability of the contents-information receiver apparatus.

7. An authentication system including a contents-information sender apparatus and a contents-information receiver apparatus, the authentication system comprising:

first means for sending first information from the contents-information receiver apparatus to the contents-information sender apparatus, the first information including a combination of certificate information representative of presence of a license granted to the contents-information receiver apparatus and identification information for identifying the contents-information receiver apparatus, the first information further including a signal of a signature for the combination of the certificate information and the identification information;

second means provided in the contents-information sender apparatus for determining whether the combination of the certificate information and the identification information in the first information sent by the first means is correct or wrong in response to the signal of the signature in the first information;

third means provided in the contents-information sender apparatus for extracting the identification information from the first information sent by the first means and storing the extracted identification information;

fourth means for sending the identification information to the contents-information sender apparatus at a time different from a time of sending by the first means; and fifth means provided in the contents-information sender apparatus for collating the identification information sent by the fourth means with the identification information stored by the third means.

8. An authentication system as recited in claim 7, wherein the certificate information contains information of a reliability of the contents-information receiver apparatus.

9. A method as recited in claim 1, wherein the certificate information contains a signal of a public key being a mate to a secret key for generating the signal of the signature from the combination of the certificate information and the identification information.

10. A method as recited in claim 1, wherein the certificate information contains information related to a copyright on contents.

11. A method as recited in claim 1, wherein the certificate information contains public information given only to licensees.

12. A method as recited in claim 1, wherein the certificate information contains a signal of a public key peculiar to the 10 contents-information receiver apparatus.

13. A method as recited in claim 1, wherein the certificate information is given to the contents-information receiver apparatus by a management organ.

14. A method as recited in claim 1, further comprising the step of, after the step e), exchanging a signal of a first key and a signal of a second key between the contents-information sender apparatus and the contents-information receiver apparatus.

15. A contents-information sender apparatus as recited in claim 3, wherein the certificate information contains a signal of a public key being a mate to a secret key for generating the signal of the signature from the combination of the certificate information and the identification information.

16. A contents-information sender apparatus as recited in claim 3, wherein the certificate information contains information related to a copyright on contents.

17. A contents-information sender apparatus as recited in claim 3, wherein the certificate information contains public information given only to licensees.

18. A contents-information sender apparatus as recited in claim 3, wherein the certificate information contains a signal of a public key peculiar to the contents-information receiver apparatus.

19. A contents-information sender apparatus as recited in claim 3, wherein the certificate information is given to the contents-information receiver apparatus by a management organ.

20. A contents-information sender apparatus as recited in claim 3, further comprising sixth means for, after the collating by the fifth means, exchanging a signal of a first key and a signal of a second key with the contents-information receiver apparatus.

21. A contents-information receiver apparatus as recited in claim 5, wherein the certificate information contains a signal of a public key being a mate to a secret key for generating the signal of the signature from the combination of the certificate information and the identification information.

22. A contents-information receiver apparatus as recited in claim 5, wherein the certificate information contains information related to a copyright on contents.

23. A contents-information receiver apparatus as recited in claim 5, wherein the certificate information contains public information given only to licensees.

24. A contents-information receiver apparatus as recited in claim 5, wherein the certificate information contains a signal of a public key peculiar to the contents-information receiver apparatus.

25. A contents-information receiver apparatus as recited in claim 5, wherein the certificate information is given to the contents-information receiver apparatus by a management organ.

26. A contents-information receiver apparatus as recited in claim 5, further comprising third means for exchanging a signal of a first key and a signal of a second key with the contents-information sender apparatus after identification-information collation is done by the contents-information sender apparatus.

27. An authentication system as recited in claim 7, wherein the certificate information contains a signal of a public key being a mate to a secret key for generating the signal of the signature from the combination of the certificate information and the identification information.

28. An authentication system as recited in claim 7, wherein the certificate information contains information related to a copyright on contents.

29. An authentication system as recited in claim 7, wherein the certificate information contains public information given only to licensees.

30. An authentication system as recited in claim 7, wherein the certificate information contains a signal of a public key peculiar to the contents-information receiver apparatus.

31. An authentication system as recited in claim 7, wherein the certificate information is given to the contents-information receiver apparatus by a management organ.

32. An authentication system as recited in claim 7, further comprising sixth means for, after the collating by the fifth means, exchanging a signal of a first key and a signal of a second key between the contents-information sender apparatus and the contents-information receiver apparatus.

* * * * *